C. B. GRAY.
MACHINE FOR CUTTING SHEET FORM MATERIAL.
APPLICATION FILED NOV. 21, 1918. RENEWED JUNE 25, 1920.
1,366,790.
Patented Jan. 25, 1921.
13 SHEETS—SHEET 7.
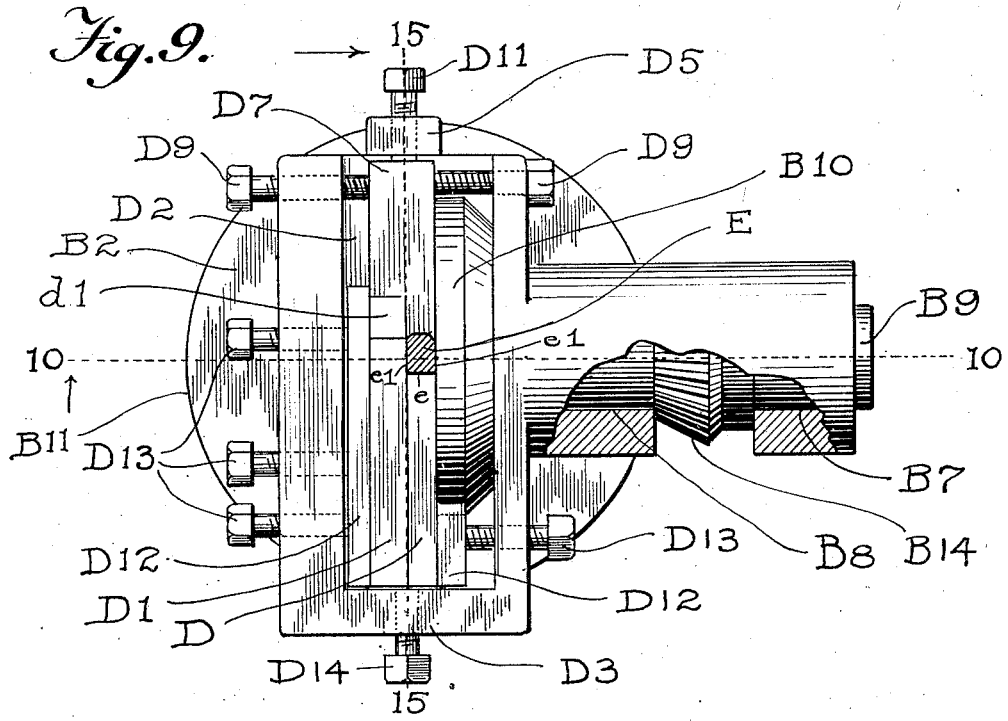
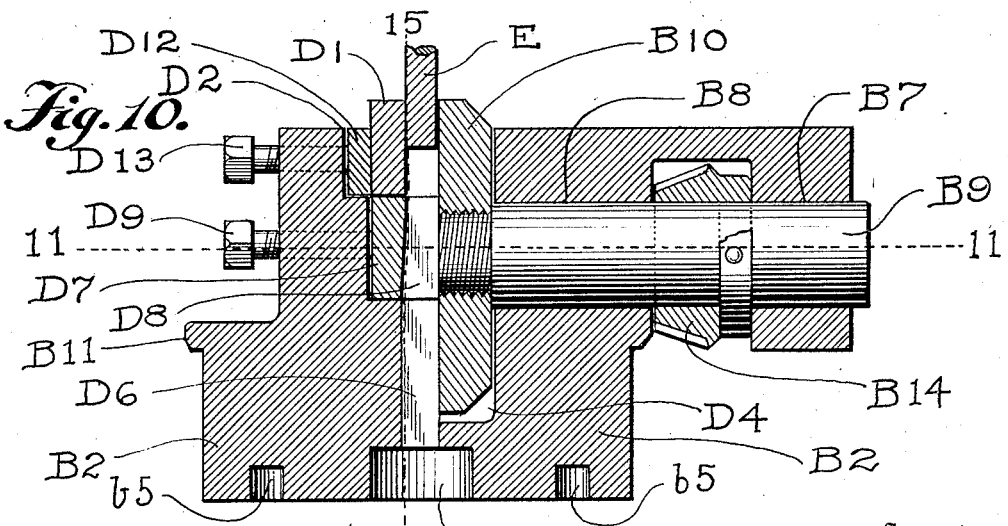
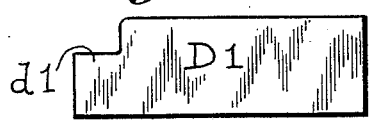
Inventor
Charles B. Gray
By Cyrus Kehr
Attorney

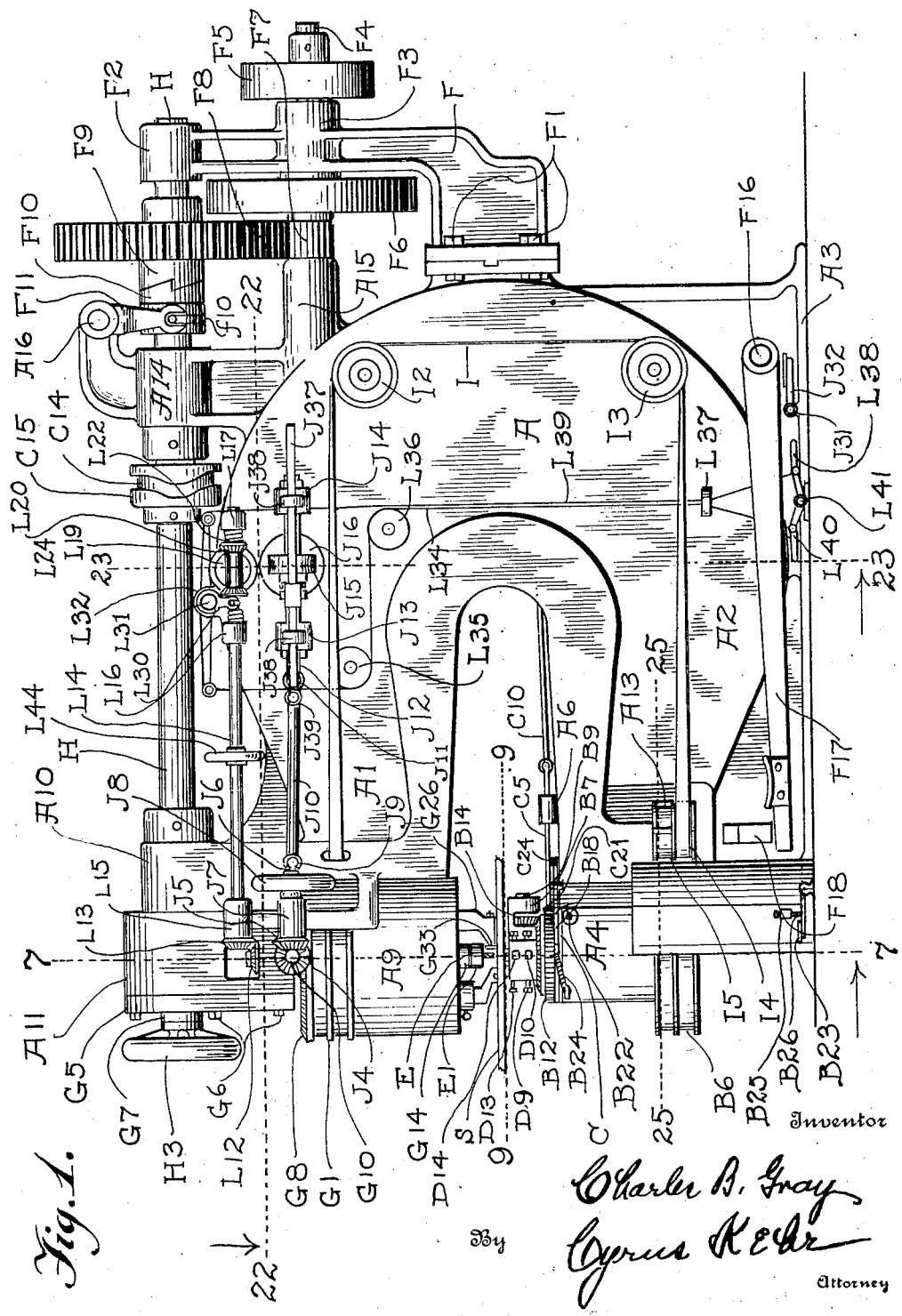

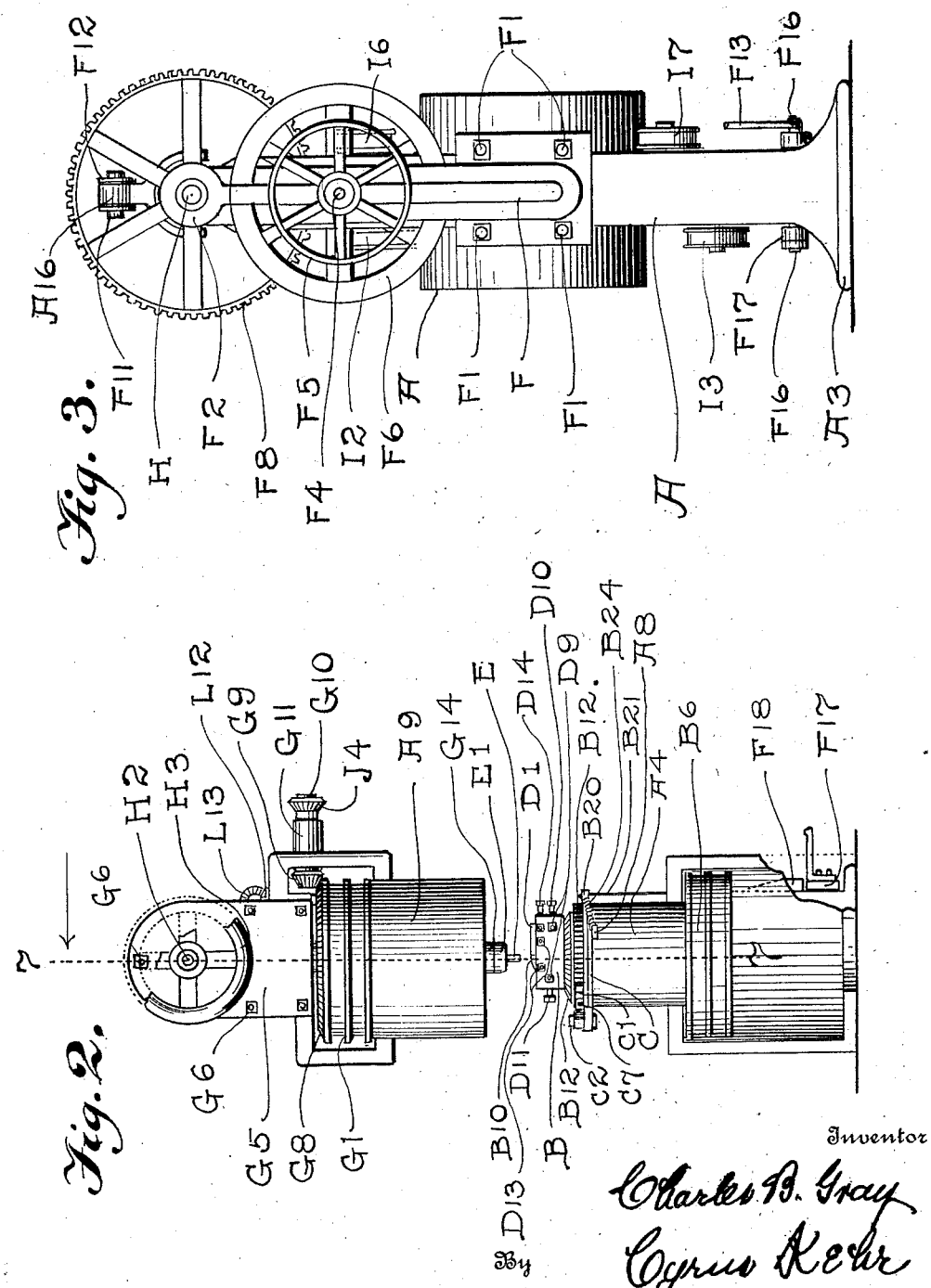

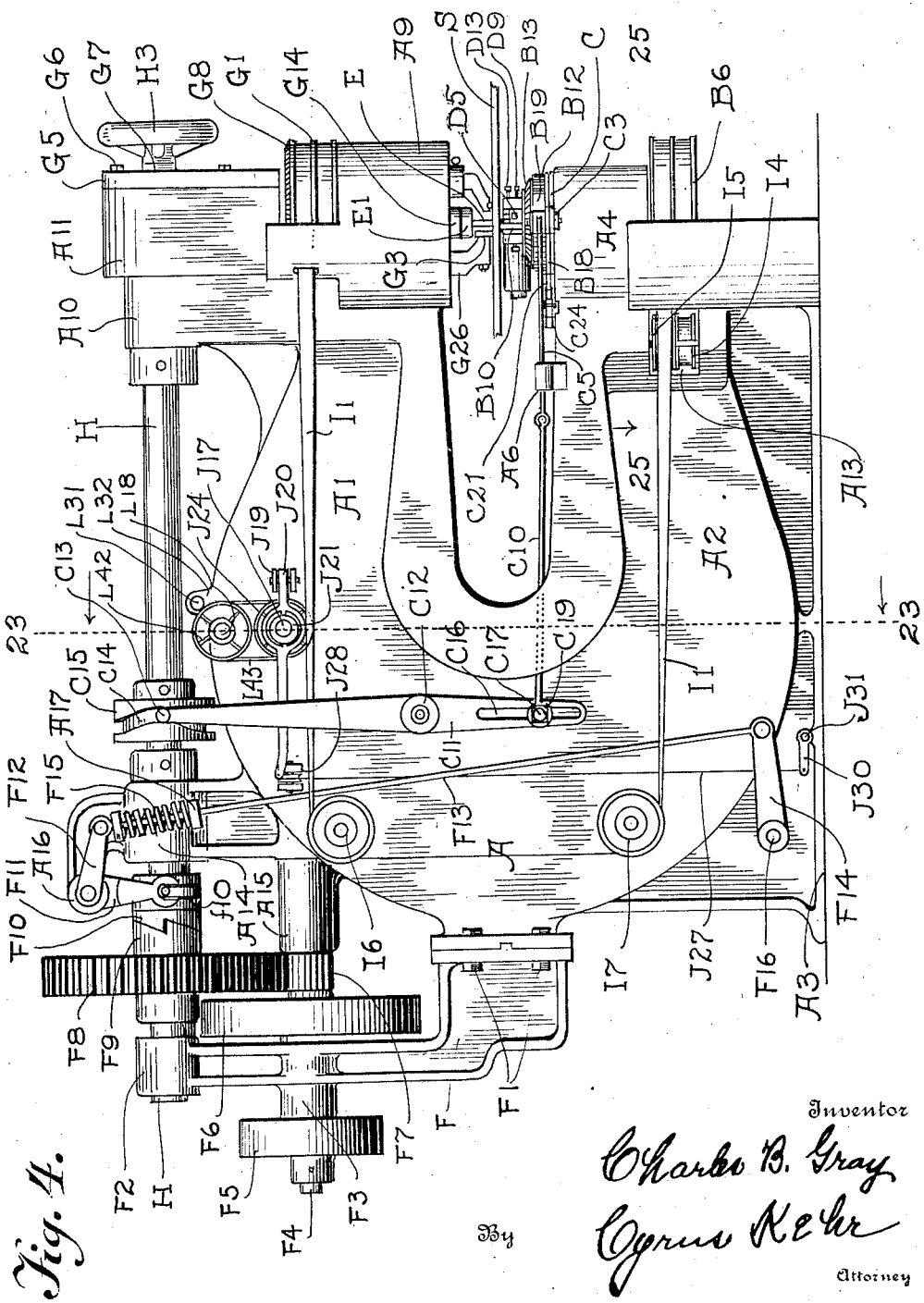

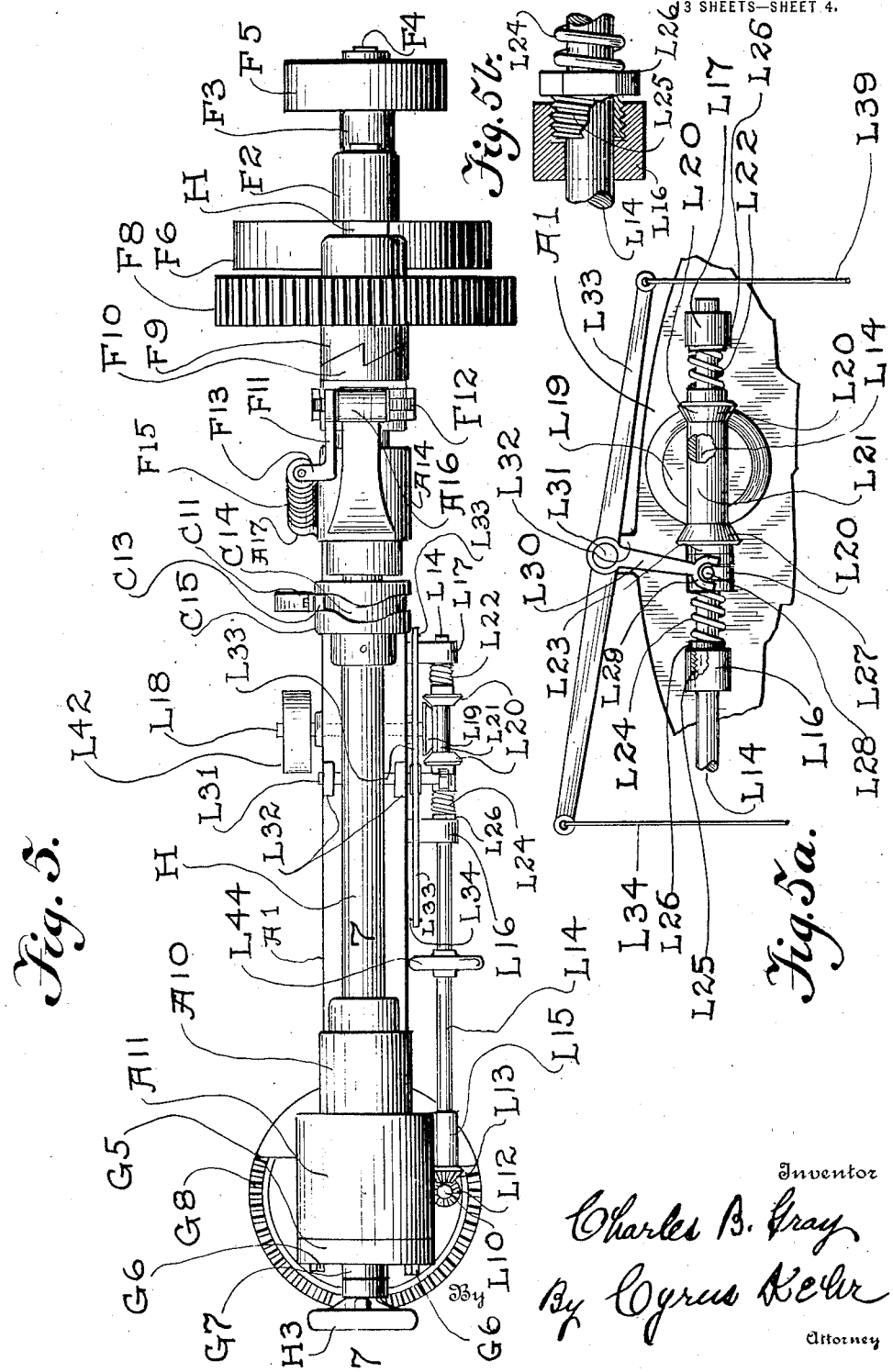

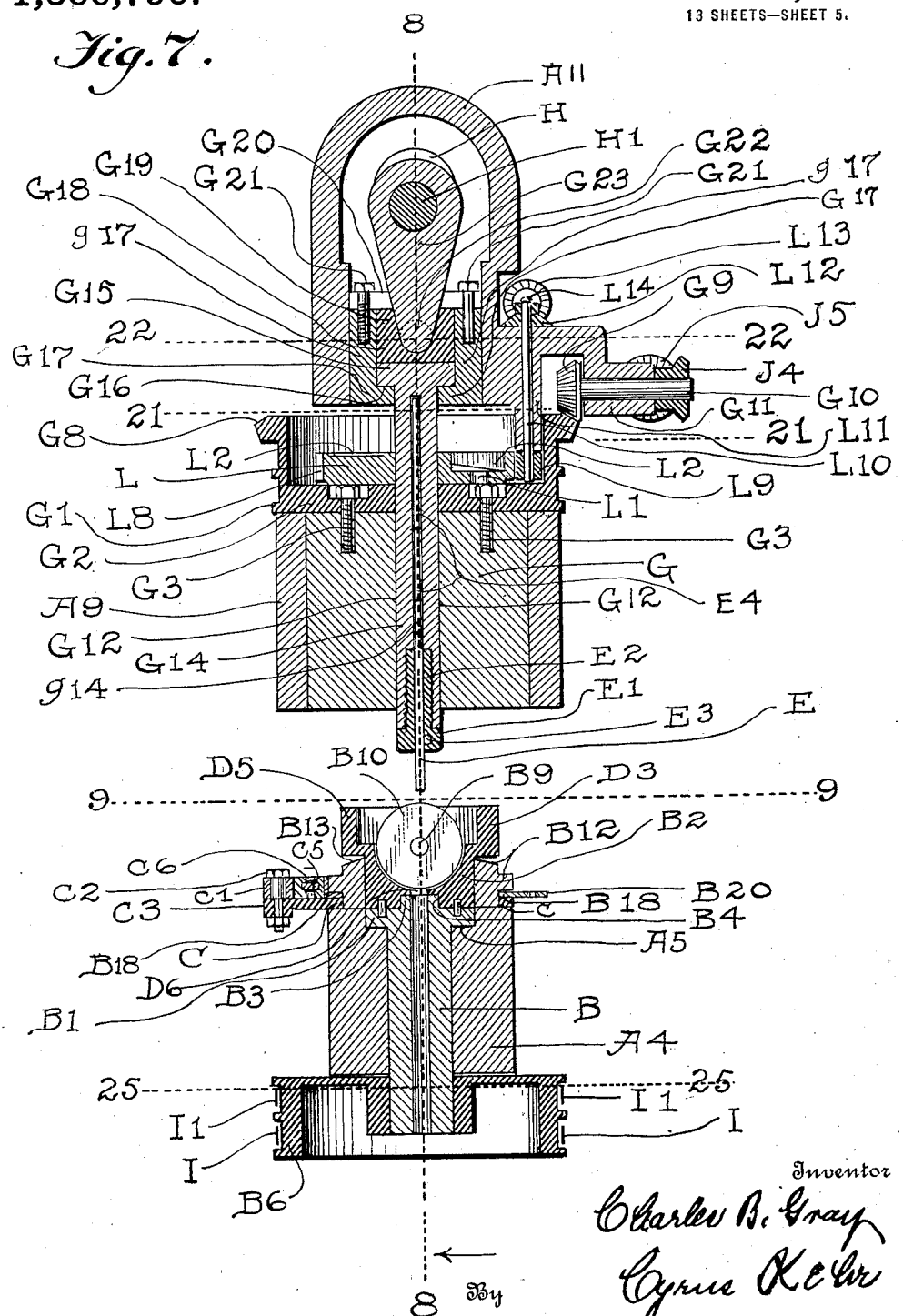

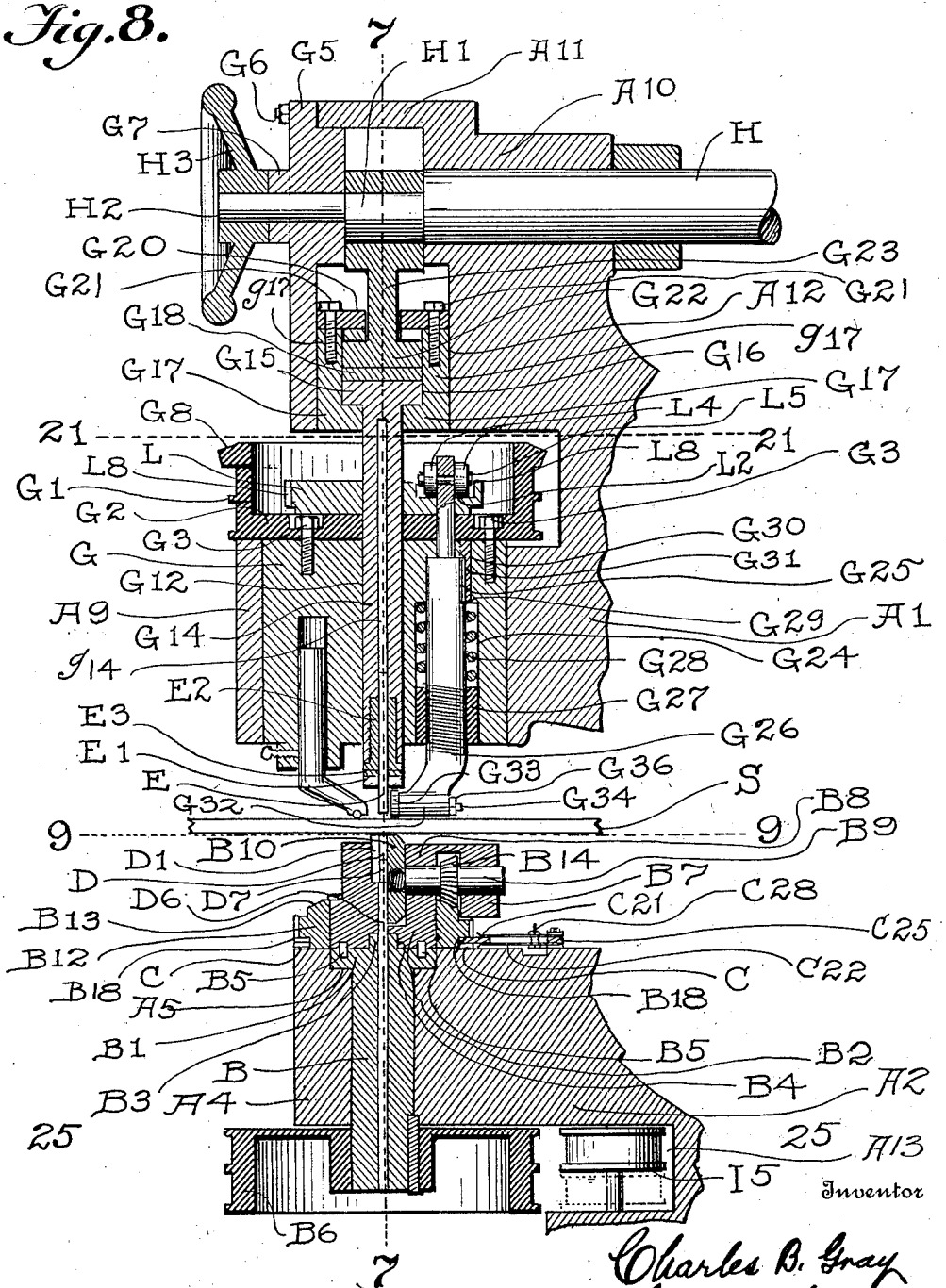

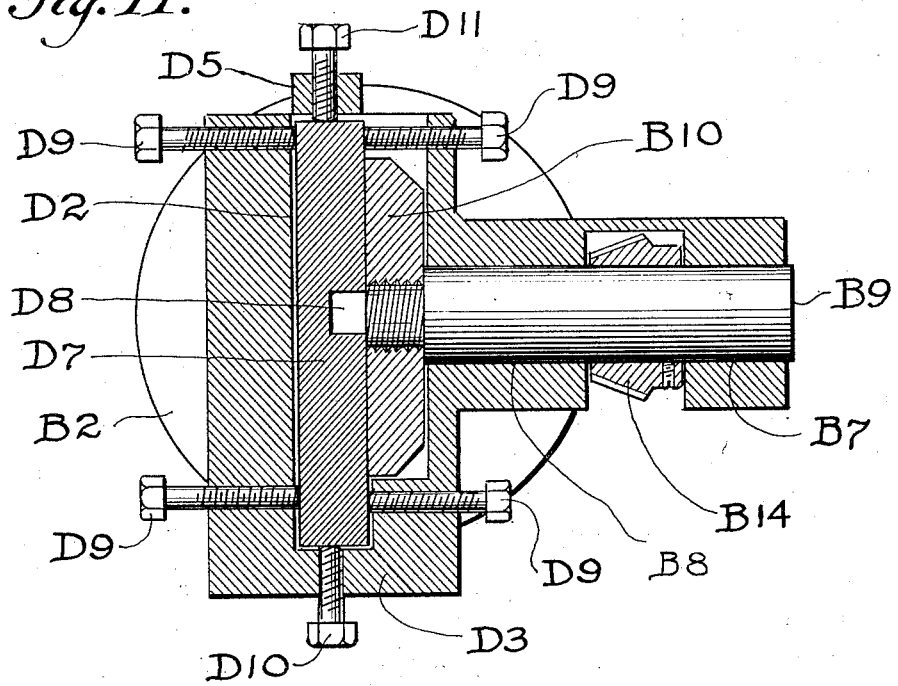
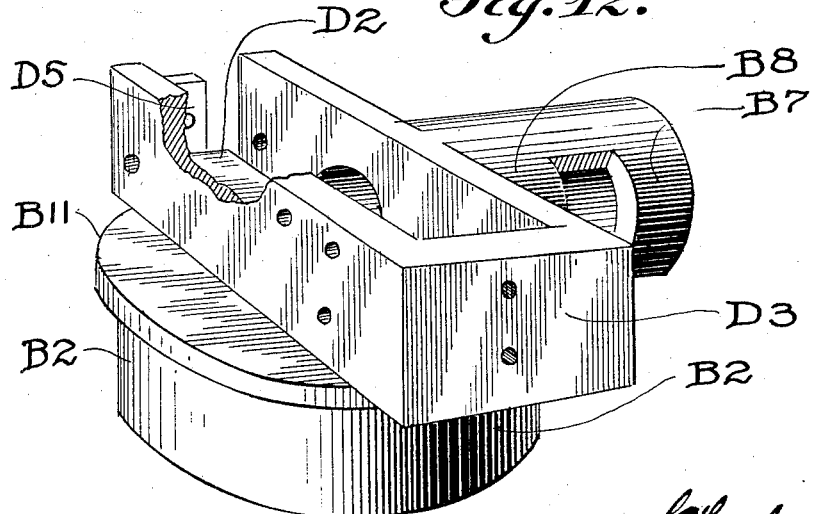

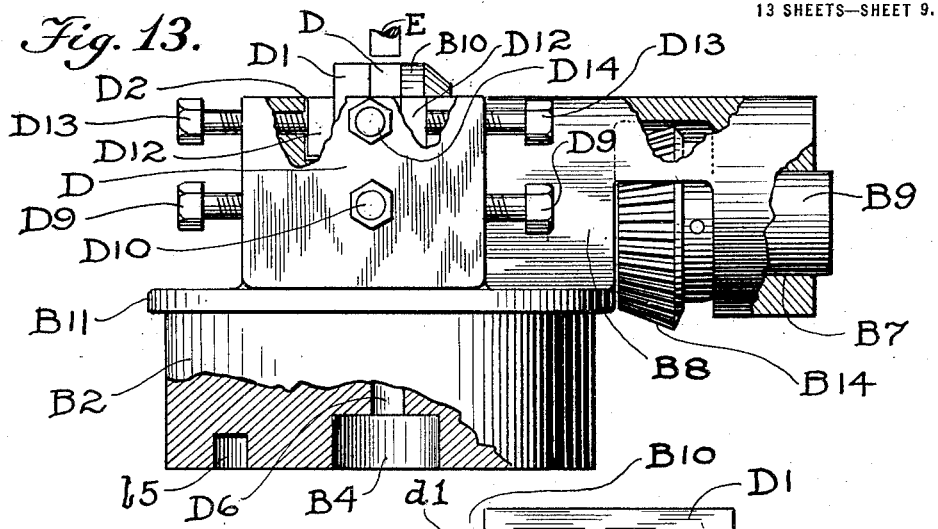
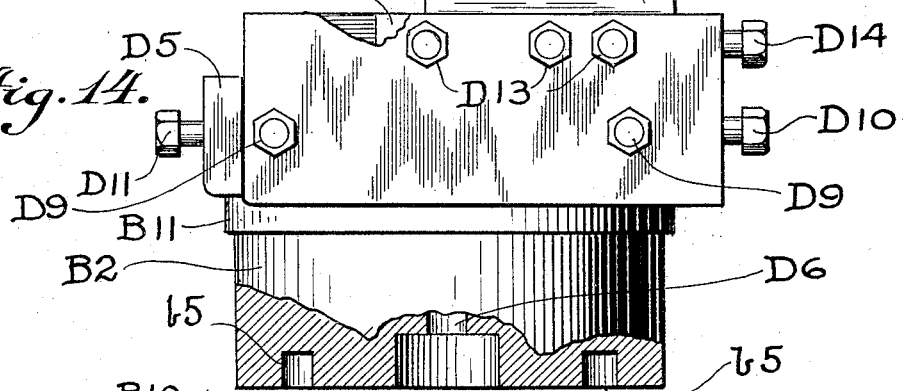
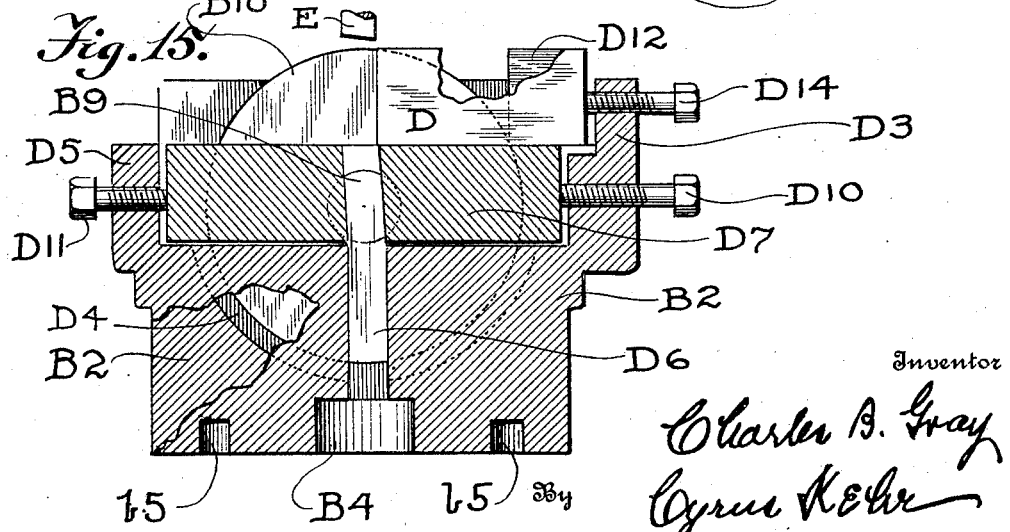

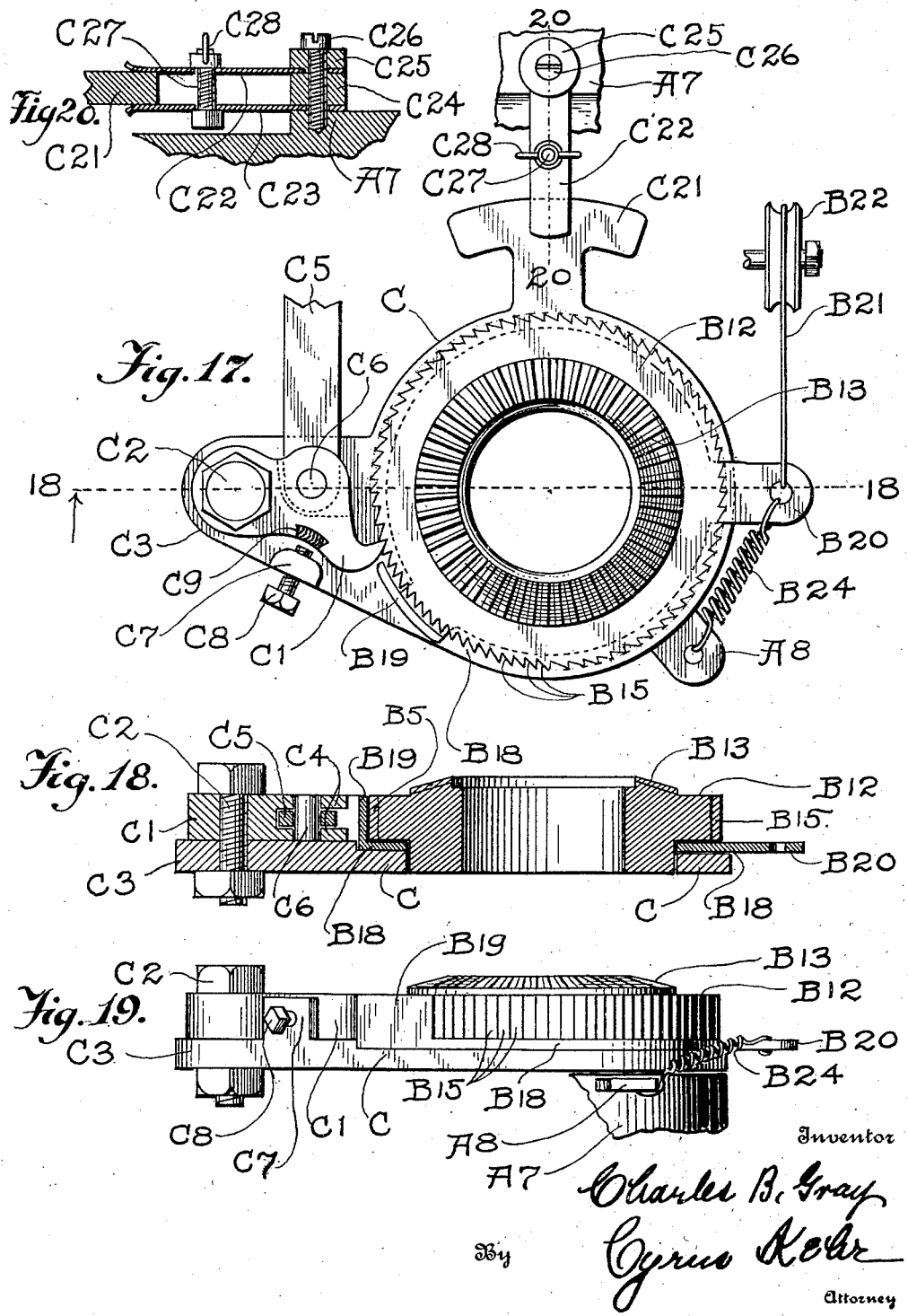

C. B. GRAY.
MACHINE FOR CUTTING SHEET FORM MATERIAL.
APPLICATION FILED NOV. 21, 1918. RENEWED JUNE 25, 1920.
1,366,790. Patented Jan. 25, 1921.
13 SHEETS—SHEET 11.
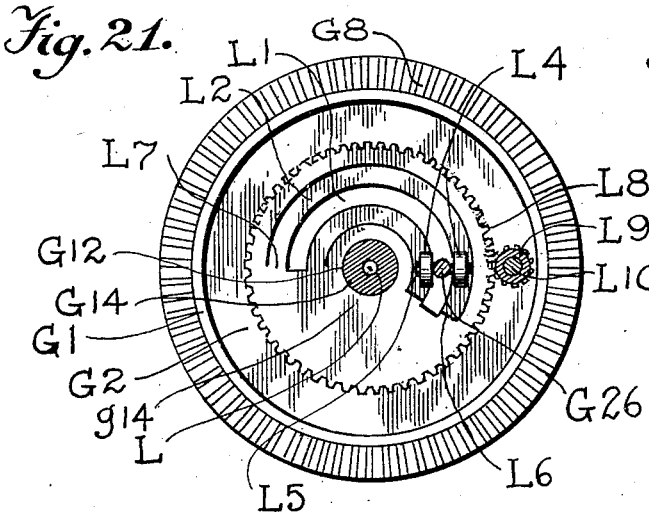
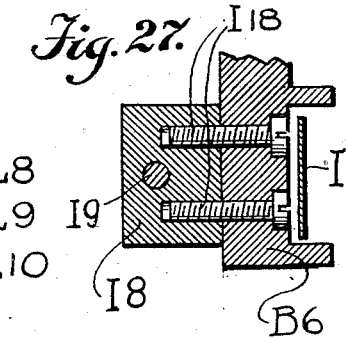
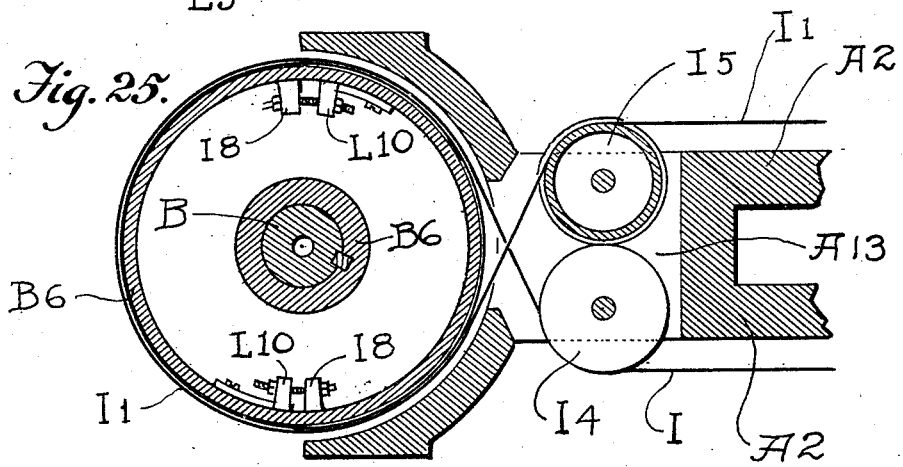
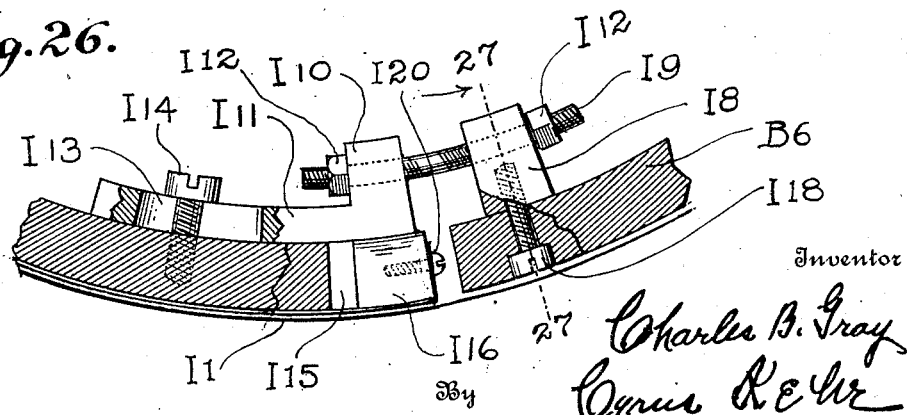

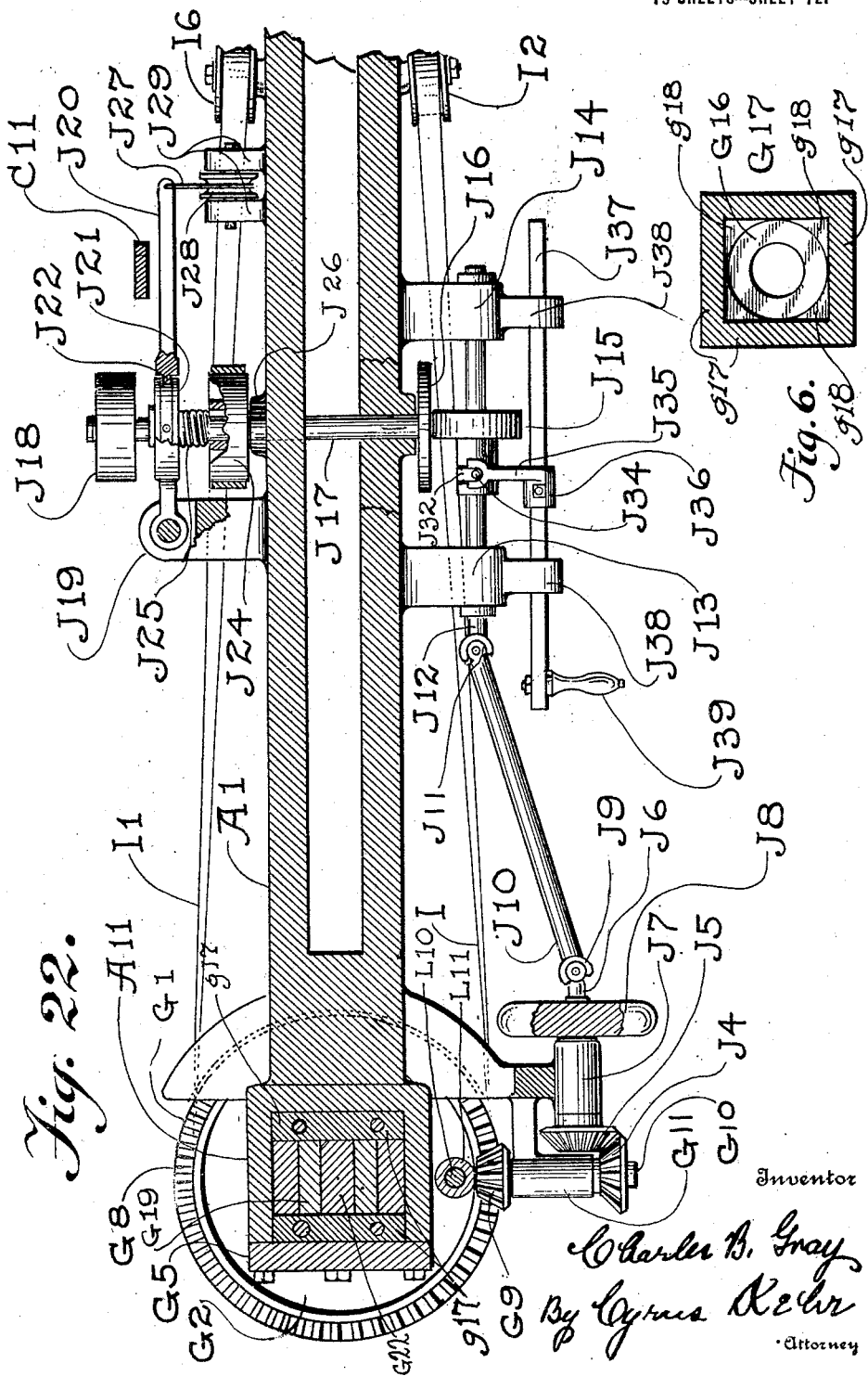

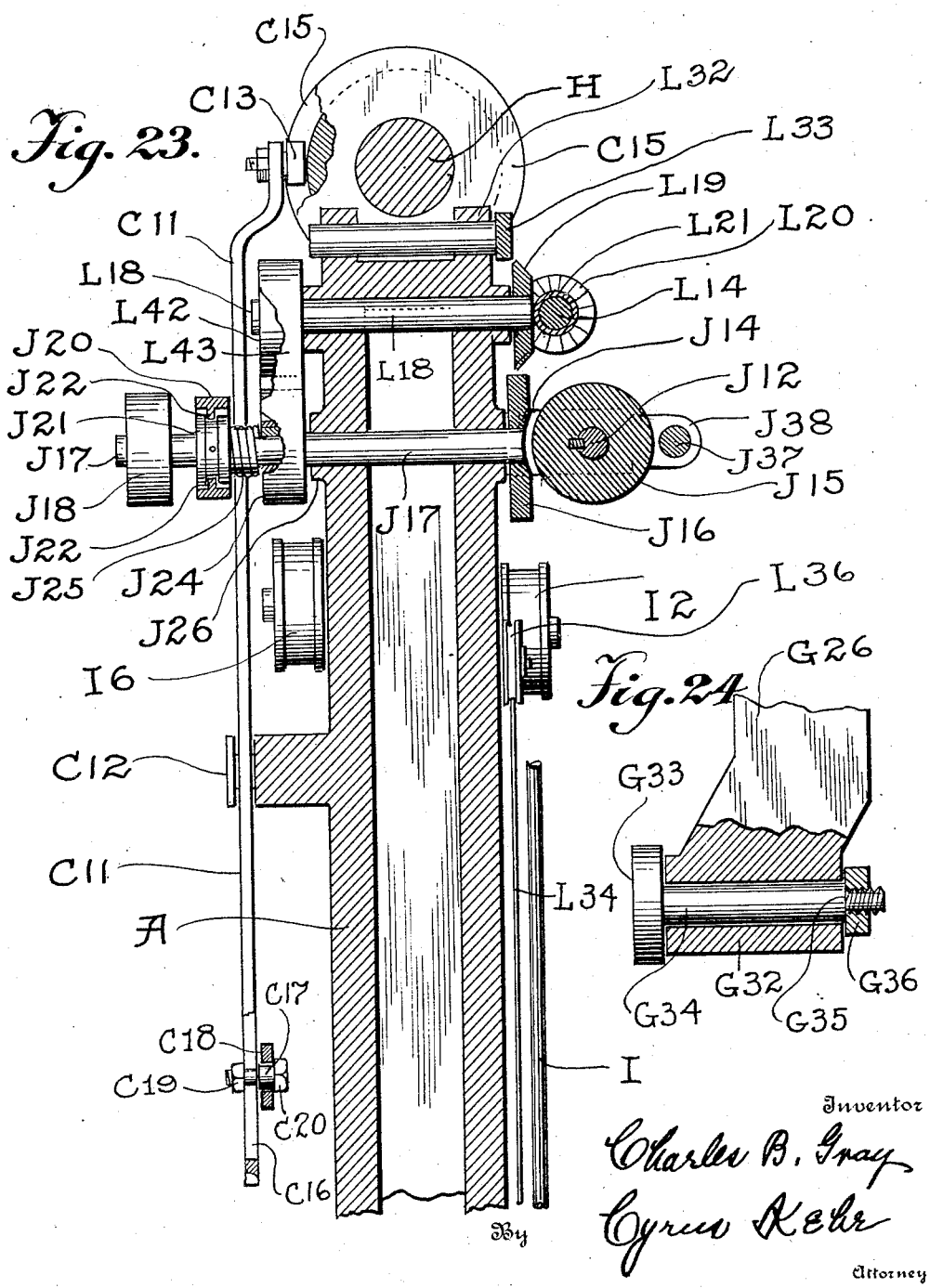

UNITED STATES PATENT OFFICE.

CHARLES BAXTER GRAY, OF KNOXVILLE, TENNESSEE.

MACHINE FOR CUTTING SHEET-FORM MATERIAL.

1,366,790.          Specification of Letters Patent.     Patented Jan. 25, 1921.

Application filed November 21, 1918, Serial No. 263,555. Renewed June 25, 1920. Serial No. 391,837.

*To all whom it may concern:*

Be it known that I, CHARLES BAXTER GRAY, a citizen of the United States, residing at Knoxville, in the county of Knox and State of Tennessee, have invented a new and useful Improvement in Machines for Cutting Sheet-Form Material, of which the following is a specification, reference being had to the accompanying drawing.

This improvement relates particularly to machines for making step-by-step cuts in a sheet, pieces of equal width being cut out at each step and this resulting in forming a slot of indefinite length and as wide as the width of the pieces which are cut out. The cutting mechanism comprises a reciprocatory cutter bar located at one side of the sheet plane and adapted to work in opposition to cutting members located at the opposite side of the sheet plane, the reciprocatory cutter penetrating the sheet during each downward stroke and constituting the active or dominating member of the cutting mechanism.

The object of this invention is to provide a form of mechanism for feeding the sheet step-by-step between strokes of the reciprocatory cutting member, such feed mechanism comprising feed members located at opposite sides of the sheet plane. A further object of the invention is to provide power-actuated means for turning the feed mechanism on an upright axis, whereby the direction of feed is changed, said power-actuated mechanism being under the control of the operator.

The machine comprises a group of cutting members and feed mechanism located below the sheet plane and supported on a body which is rotatable on an upright axis which is in approximate alinement with the reciprocatory upper cutter. The machine further comprises a turret body located above the sheet plane and rotatable on the above-mentioned axial line and forming a guide for an upright reciprocatory member located on said axial line and rotatable in unison with said turret body which supports the upper cutter so as to compel the latter to rotate in unison with the turret body. Said turret body also supports feed mechanism adapted to coöperate with the lower feed mechanism for feeding the sheet between strokes of the reciprocatory cutter. With said feed mechanism located above the sheet plane is associated power-actuated and operator-controlled means for raising said part of the feed mechanism out of engagement with the sheet, a spring being applied to said feed mechanism to yieldingly press downward in opposition to said power-actuated means.

With the upper turret or rotatable body is associated power-actuated and operator-controlled means for turning said bodies on the above-mentioned upright axial line.

With the upper and lower turrets or rotatable bodies is also associated improved means for transmitting motion from said upper turret to the lower turret which supports the lower cutting mechanism and the feed mechanism which is located below the sheet plane, said transmission means being so related to the turrets as to cause them to rotate in unison when the upper turret is rotated.

The direction of the line on which the feed mechanism acts is changed by the partial turning of said turrets, such partial turning carrying the feed members in an orbital path which is concentric with the turret axis. This change of direction of action of the feed mechanism changes the direction in which the sheet is fed without changing the position of the sheet in the sheet plane by the operator. When the turrets are stationary, the direction of feeding of the sheet effected by the feeding mechanism is varied by manually turning said sheet in a horizontal plane (the sheet plane) on said upright axial line.

While, as above stated, power-actuated operator-controlled means are provided for turning the upper turret, provision is also made for manually turning said turret. By using the power-actuated means for this purpose, the turret can be turned in less time than would be required for turning said turret manually. It is intended that the manual means for turning said turret will be used when said turret is to be turned through only a small part of a rotation, and that the power-actuated means will be used when the rotation of the turret is to be through a considerable part of a full rotation. Furthermore, when a machine is made large for the cutting of thick sheets, a relatively large amount of power will be required for turning said turret, and then it may be desirable to use the power-actuated means for turning the turret through even a small part of a full rotation.

In the accompanying drawings,—

Figure 1 is a front elevation of a machine embodying my improvement;

Fig. 2 is an end elevation looking toward the right;

Fig. 3 is an end elevation looking toward the left;

Fig. 4 is a rear elevation;

Fig. 5 is a plan of the machine; Figs. 5ª and 5ᵇ are details of transmission mechanism shown in Fig. 5;

Fig. 6 is a horizontal section through the coupling member in which the head of the reciprocatory cutter is supported;

Fig. 7 is an upright section on the line, 7—7, of Figs. 1, 2 and 8;

Fig. 8 is an upright section on the line, 8—8, of Fig. 7, looking toward the right;

Fig. 9 is a horizontal section on the line, 9—9, of Figs. 1, 7 and 8, the upper cutter having been extended downward through the sheet plane;

Fig. 10 is a section on the line, 10—10, of Fig. 9, looking in the direction of the arrow, only the bar supporting the lower cutters being shown;

Fig. 11 is a horizontal section on the line, 11—11, of Fig. 10;

Fig. 12 is a perspective of the chair which supports the lower cutters, a part being broken away;

Fig. 13 is a front elevation of said chair, portions being broken away and the cutters being applied;

Fig. 14 is an elevation of said chair, looking toward the left, parts being broken away;

Fig. 15 is an upright section on the line, 15—15, of Figs. 9 and 10, looking toward the right;

Fig. 16 is an elevation of one of the lower cutter bars, looking toward the right;

Fig. 17 is a plan of pawl and ratchet mechanism for transmitting to the lower cutter wheel a step-by-step motion, the bar supporting the lower cutters having been removed;

Fig. 18 is an upright section on the line, 18—18, of Fig. 17, looking in the direction of the arrow;

Fig. 19 is an elevation of the mechanism shown by Fig. 17, the view being in the direction of the arrow in Fig. 17;

Fig. 20 is an upright section on the line, 20—20, of Fig. 17, looking toward the left;

Fig. 21 is a horizontal section on the line, 21—21, of Figs. 7 and 8;

Fig. 22 is a horizontal section on the line, 22—22, of Figs. 1 and 7;

Fig. 23 is an upright section on the line, 23—23, of Fig. 4, looking toward the left;

Fig. 24 is a sectional detail of the upper presser;

Fig. 25 is a horizontal section on the line, 25—25, of Figs. 1 and 7;

Fig. 26 is a sectional detail plan of strap adjusting mechanism shown in Fig. 25;

Fig. 27 is a section on the line, 27—27, of Fig. 26, looking toward the right.

Referring to said drawings, A is the body of the machine. This has an upper horizontal arm, $A^1$, and a lower horizontal arm, $A^2$, and a base, $A^3$.

Between said arms is the "throat" of the machine. On the left of the arm, $A^2$, is an upright bearing, $A^4$, in which rests the tubular lower turret, B, on the upper end of which is a circular head, $B^1$. Said head rests in an enlargement, $A^5$, of said bearing and the upper face of the head is flush with the upper end of said bearing. On said head is seated the base of a chair, $B^2$, said base being circular in horizontal cross-section and of the same diameter as said head. A cylindrical tubular neck, $B^3$, rises on the head, $B^1$, on the axial line of said head and enters a socket, $B^4$, formed in the lower face of the chair, $B^2$. Studs, $B^5$, rising from the head, $B^1$, enter corresponding sockets, $b^5$, (Figs. 1, 13 and 15) in the lower face of the base of the chair, $B^2$. By this means engagement is made between said turret and said chair, whereby said chair is compelled to turn in unison with the turret, B, when the latter turns on its upright axis in the upright bearing, $A^4$.

A drum, $B^6$, surrounds the lower end of the turret, B, and is keyed thereto. Said drum has two circumferential grooves or channels each of which is adapted to receive a strap or chain or cable, to impart rotation to said drum and said turret as will be hereinafter described.

On said chair are supported two cutter bars and a roller which operates as a lower cutter member and also as a lower feed member. Said lower cutter members work in opposition to the upper reciprocatory cutter, E, which will be described farther on. On the chair, $B^2$, is an outer, horizontal bearing, $B^7$, and an inner horizontal bearing, $B^8$, in alinement with the bearing, $B^7$. In said bearings rests a shaft, $B^9$, which projects through the bearing, $B^8$, nearly to the axial line of the lower turret, B. $B^{10}$ is a roller surrounding the shaft, $B^9$, and fixed thereon. Said roller reaches upward into position to bear against the lower face of the sheet, S, which is to be cut, and said roller extends near enough to the axial line of the turret, B, to bring the roller close to the right-hand face of the reciprocatory cutter, E, when the latter extends below the sheet, S.

The lower feed roller, $B^{10}$, cuts in conjunction with the right-hand edge of the upper cutter, E, and the latter also cuts in conjunction with the cutter bars, D and $D^1$. The upper part of the chair has an upright channel, $D^2$, extending from the upper face downward and from the rear end of the chair forward nearly to the front end of the latter. At the front of said channel, $D^2$, is an upright wall, $D^3$. At the rear of said channel is a standard, $D^5$. The width of the channel from left to right equals about twice the thickness of said roller, $B^{10}$. From the channel, $D^2$, a chamber, $D^4$, extends downward and opens through the lower face of said chair. The length of the cross section of said chamber equals the diameter of the roller, $B^{10}$, and the width of the cross section of said chamber equals the thickness of said roller. In the form shown in the drawings, the bottom of the channel, $D^2$, is at the height of the axial line of the shaft, $B^9$, so that the lower half of the roller, $B^{10}$, is in the upper part of the chamber, $D^4$. In the right hand wall of the chamber, $D^4$, is an upright channel, $D^6$, extending from the channel, $D^2$, entirely through the bottom of the chair.

Into the lower part of the channel, $D^2$, is placed a foundation bar, $D^7$, said bar is only wide enough to fill the space in said channel at the left of the feed roller, $B^{10}$. Above the channel, $D^6$, and in alinement therewith, the right hand face of the foundation bar, $D^7$, has an upright channel, $D^8$, opening through the upper and lower faces of the foundation bar. The channels, $D^6$ and $D^8$, are on a line which crosses the axial line of the drive shaft, $B^9$.

Bolts, $D^9$, are placed horizontally and at right angles to and at opposite sides of the foundation bar and extend through the upright chair walls and bear against the right side and the left side of the foundation bar to secure the latter after it has been put into the desired position. At the front end of the bar, $D^7$, a set bolt, $D^{10}$, extends horizontally through the chair wall, $D^3$, in position to bear against the front end of said bar. Opposite the rear end of said bar is a set bolt, $D^{11}$, which extends through the rear standard, $D^5$, and is directed toward and adapted to bear against the rear end of the bar, $D^7$. When said bar is to be positioned, it is placed into the channel, $D^2$, in approximately its correct position. Then it is moved endwise by driving the bolt, $D^{10}$, or the bolt, $D^{11}$, forward, as may be needed to bring the channel, $D^8$, of said bar into register with the upright channel, $D^6$. When that has been done, the opposite set bolt, is driven forward to make engagement with the end of the bar. Then the lateral bolts, $D^9$, are driven forward to engage said bar.

On the foundation bar $D^7$, lie the two stationary cutter bars, $D$ and $D^1$. The bar, $D$ is at the right and the bar, $D^1$, at the left. The bar, $D$, lies close to the roller, $B^{10}$, and has its upper face at a level with the highest part of said roller, and the width of the cutting member, $D$, equals the width of the upper reciprocatory cutter, $E$, so that the rear and working or cutting edge of the bar, $D$, may coöperate with the front edge of the reciprocatory cutter. The upper face of the cutter bar, $D^1$, extends rearward far enough to adapt its right hand edge to work with the left hand edge of the reciprocatory cutter. Below its upper face, the bar, $D^1$, has a rearward extension, $d^1$, (Figs. 9, 14 and 16) which increases the support of said bar on the foundation bar. At each side of the pair of cutter bars, $D$ and $D^1$, is a bearing plate, $D^{12}$. Bolts, $D^{13}$, extend horizontally through the side walls of the chair in position to bear against the plates, $D^{12}$, and press the latter against the cutting bars. Opposite the front end of the cutting bars, $D$ and $D^1$, a set bolt, $D^{14}$, extends through the front wall, $D^3$, of the chair in position to be driven forward against said bars. Precise setting of the bar, $D^1$, is not needed, but the bar, $D$, must be set so as to bring its rear end accurately into position relative to the front edge of the upper reciprocatory cutter. To accomplish this, the bar, $D$, is placed with its rear or working end a little forward of the channel, $D^8$, the bolts, $D^{13}$, being at the time retracted. Then the reciprocatory cutter is lowered to bring its cutting edges close to the upper level of the bars, $D$ and $D^1$. Then the bolt, $D^{14}$, is driven forward until the bar, $D$, has been moved sufficiently to bring its cutting edge into precise relation with the reciprocatory cutter. When the bars, $D$ and $D^1$, are put into position prior to adjustment, they are placed far enough to the left to bring the right hand edge of the bar, $D^1$, a little leftward of the channel, $D^8$. After the bar, $D$, has been adjusted as above described, the left hand bolts, $D^{13}$, are driven forward to bring the right hand edge of the bar, $D^1$, into accurate relation with the left hand cutting edge of the reciprocatory bar, when the right hand set bolts, $D^{13}$, are driven forward to press the right hand plate, $D^{12}$, against the right hand face of the cutting bar, $D$. By this means, the two cutting bars, $D$ and $D^1$, and the binding plates, $D^{12}$, are firmly clamped to each other, the cutting edges of the bars $D$ and $D^1$, retaining the positions given them by driving the bolt, $D^{11}$, and the rear bolt, $D^{13}$, forward.

The channel, $D^8$, extends, leftward a little farther than the right hand face of the cutting bar, $D^1$, and slightly forward of the rear end of the cutting bar, $D$, in order that cuttings released from the sheet may readily fall through said channel. From the channel, $D^8$, the cuttings fall through the throat, $D^6$, and through the turret, $B$.

It will now be observed that the rear or working ends of the cutting bars, $D$ and $D^1$, are substantially supported to resist heavy downward pressure or blows, and that good provision is made for adjusting said bars relative to the path of the upper reciprocatory cutter. The chair forms a firm seat for the foundation bar. The working ends of the bars, D and $D^1$, are seated upon the foundation bar and are thus given the support of the well-supported foundation bar. Thus there can be no downward flexing of the cutter bars. The foundation bar is to be made of a quality of metal adapted to be made hard, and it is to be specially treated for extreme hardness, in order that it may not become battered by blows transmitted through the cutting bars, D and $D^1$. But when said bar becomes battered or chipped or broken to such extent as to make renewal desirable, it may be removed and a new bar put into its place.

The base of the chair, $B^2$, is cylindrical and axially in line with the head, $B^1$. Above said base is a horizontal annular flange, $B^{11}$. Between said flange and the upper face of the bearing, $A^4$, a gear and ratchet ring, $B^{12}$, surrounds said base and rests upon the upper face of the bearing, $A^4$. On the upper face of said ring is a crown of bevel gear teeth, $B^{13}$, meshing with the small bevel gear wheel, $B^{14}$. The ring, $B^{12}$, is free to rotate independently of the chair base and the head, $B^1$, and the turning of said ring causes the latter to turn the smaller bevel gear wheel, $B^{14}$, and the shaft, $B^9$, and the feed roller, $B^{10}$. Said ring is to be given a step-by-step rotation in order that the feed roller may be turned step-by-step far enough to carry the sheet, S, as far as may be desired every time the upright reciprocatory cutter rises above the sheet plane. The ring, $B^{12}$, is given its step-by-step rotation by means which will next be described.

Below the crown, $B^{13}$, of gear teeth, the outer face of the ring, $B^{12}$, is provided with ratchet teeth, $B^{15}$, which are to be engaged by a pawl, $C^1$, which is journaled on a stud, $C^2$, rising from a horizontal arm, $C^3$, projecting rearward from the pawl ring, C, which loosely surrounds the lower part of the gear ring, $B^{12}$, and rests loosely on the upper face of the bearing, $A^4$. On the pawl are two rightward-directed horizontal ears, $C^4$. The left hand end of a reciprocatory bar, $C^5$, extends between said ears and is coupled thereto by an upright pin, $C^6$. At the left of the pawl, $C^1$, a lug, $C^7$, rises from the arm, $C^3$. A bolt, $C^8$, extends horizontally through said lug and forms a stop for limiting the leftward movement of the pawl. A cushion, $C^9$, of leather or rubber or any similar material is shown placed on the pawl in position to make contact with the inner end of the bolt, $C^8$. The purpose of said cushion is to reduce shock when the pawl meets said bolt. Said bolt is to be so set as to allow the pawl to move leftward only far enough to definitely disengage from the teeth, $B^{15}$, of the ring, $B^{12}$, as will be described further on.

At the right of the chair, $B^2$, is a horizontal slide bearing, $A^6$, through which the bar, $C^5$, extends. At the right of said bearing, the end of said bar is coupled to one end of a link, $C^{10}$. The opposite end of said link is coupled to the lower end of an upright rocking arm, $C^{11}$. Said arm is pivoted on a horizontal stud, $C^{12}$, rigid on the rear face of the body, A. The upper end of said arm bears a roller, $C^{13}$, which extends into a groove, $C^{14}$, on a cam, $C^{15}$, mounted immovably on the shaft, H. Said groove has one leftward extension, whereby the roller, $C^{13}$, and the upper end of the arm $C^{11}$, are moved leftward and then immediately rightward to normal position during each rotation of said cam. The lower end of the arm, $C^{11}$, is shown provided with an upright slot, $C^{16}$, through which extends a bolt, $C^{17}$, which has a shoulder, $C^{18}$, bearing against one side of the arm, $C^{11}$. At the opposite side of said arm is a nut, $C^{19}$. By tightening said nut, said bolt is bound to the arm, $C^{11}$. The length of the bolt between the shoulder, $C^{18}$, and the head, $C^{20}$, of the bolt is sufficient to extend through and make a journal for the link, $C^{10}$. When the nut, $C^{19}$, has been loosened, the bolt, $C^{17}$, may be moved upward or downward in the slot, $C^{16}$, and the bolt then again tightened. Such movement varies the length of the endwise reciprocation of the link, $C^{10}$, and the bar, $C^5$; and such variation of the movement of the bar, $C^5$, varies the number of teeth over which the pawl, $C^1$, moves during each oscillation of the pawl.

As will be described further on, the shaft, H, transmits motion to the upright reciprocatory cutter, said cutter being carried through one reciprocation during each rotation of said shaft. During the time said cutter is above the sheet plane, the sheet, S, is to be fed or moved horizontally one step. That is accomplished by turning the ring, $B^{12}$, through the action of the pawl, $C^1$. If during each reciprocation of the pawl the bar passes over only one tooth on the ring, $B^{12}$, said ring will be turned through a distance corresponding to the distance between the points of two adjoining teeth. This fractional movement of said ring will be transmitted through the small gear wheel, $B^{14}$, and the shaft, $B^9$, to the lower feed roller, $B^{10}$. If during each reciprocation the pawl is moved over more than one tooth, the movement imparted to the feed wheel is correspondingly extended.

As above indicated, the link, $C^{10}$, and the bar, $C^5$, are thrown leftward during only a small fractional part of the rotation of the shaft, H. Excepting during said fractional period, the bar, $C^5$, and the pawl, $C^1$, rest at their leftward limit, the pawl having moved leftward until it was stopped by the bolt, $C^8$, and the arm, $C^3$, having then moved leftward and correspondingly turned the pawl ring C, on the axis of the bearing, $A^4$. In this position the pawl, $C^1$, is out of engagement with the teeth, $B^{15}$, of the ratchet ring, $B^{12}$, so that said ring is free to be turned when the turret, B, is turned by the action of the belt on the drum, $B^6$, as hereinafter described.

In order that the bar, $C^5$, may always move the pawl, $C^1$, before the arm, $C^3$, is moved, frictional resistance to the turning of the pawl ring may be applied as will be next described. On the right of the pawl ring is a horizontal extension, $C^{21}$. The left hand end of a blade spring, $C^{22}$, bears against the lower face of said extension while the left hand end of a similar spring, $C^{23}$, bears against the upper face of said extension. The right hand end of the spring, $C^{22}$, rests on a horizontal seat, $A^7$, on the arm, $A^2$. Between said blades and above said seat is a spacing block, $C^{24}$. Above said block a binding block, $C^{25}$, rests on the spring, $C^{23}$. A binding screw, $C^{26}$, extends downward through said blocks and said springs into the seat, $A^7$, and bind said blocks and said springs firmly to the seat, $A^7$. An adjusting bolt, $C^{27}$, extends through both springs and bears a thumb nut, $C^{28}$. By tightening or loosening said bolt, the pressure of said springs upon the extension, $C^{21}$, may be varied, and such variation varies the power required to turn the pawl ring. This resistance and the frictional resistance offered by the engagement of the pawl ring with the ratchet ring and the upper face of the bearing, $A^4$, must definitely exceed frictional resistance to the turning of the pawl on the stud or journal, $C^2$. Since it is desirable to make the turning of the pawl ring as easy as possible, said ring is to be so seated as to make the least possible frictional engagement with the ratchet ring and the bearing, $A^4$, consistent with accurate movement. When that has been done, the desired degree of resistance to the turning of the pawl ring may be attained by varying the pressure of the springs, $C^{22}$ and $C^{23}$, upon the extension, $C^{21}$. It is to be observed that by making the springs bear upon the upper and lower faces of the extension, $C^{21}$, the frictional engagement made by the pawl ring with the ratchet ring and the bearing, $A^4$, is to be less than would be the case if pressure were applied to the pawl ring parallel to the axis of said ring.

With the ratchet ring is associated mechanism controlled by the operator for normally covering the ratchet teeth, $B^{15}$, adjacent the pawl, $C^1$, so as to prevent the pawl from reaching the teeth to make engagement with the latter during the reciprocation of the pawl. Between the pawl ring, C, and the ratchet ring, $B^{12}$, there is a flat fender ring, $B^{18}$, which supports the fender, $B^{19}$, which rises from said ring and extends across a portion of the upright face of the ratchet ring. Normally said fender extends between the ratchet ring and the edge of the pawl so that during the reciprocation of the pawl said edge slides on the outer face of said fender. The fender ring is rotatable on the lower turret axis independently of the pawl ring and the ratchet ring. On the front of the fender ring is an ear, $B^{20}$, to which is attached one end of a wire, $B^{21}$. Said wire extends rightward to a guide roller, $B^{22}$, journaled on the front of the machine body. Said wire extends downward over said roller and is joined to a pedal, $B^{23}$. By depressing said pedal, said wire is drawn endwise, whereby the forward part of the fender ring is drawn rightward. This effects a partial rotation of said ring on the turret axis, whereby the fender, $B^{19}$, is carried leftward out of the path of the pawl. When the pedal is free, a contracting coiled spring $B^{24}$, having one end attached to the ear, $B^{20}$, and having the other end attached to an ear, $A^8$, draws the fender ring to its normal position. The ear, $A^8$, is fixed on the bearing, $A^4$. To limit this movement, a yoke, $B^{25}$, extends across the pedal, $B^{23}$. An adjusting screw, $B^{26}$, extends downward through said yoke in position to be met by the pedal during the upward movement of the latter. Said pedal is stopped when it meets said screw. The range of the pedal is varied by varying the height of the screw.

On the left hand end of the arm, $A^1$, of the body, A, of the machine is an upright bearing $A^9$, in which rests the upper turret G. A drum, $G^1$, having a bottom, $G^2$, rests upon the upper end of the bearing, $A^9$, and extends across the upper end of the turret and is secured to the latter by means of upright, counter-sunk bolts, $G^3$, extending through said bottom into the turret. Thus the turret is free for rotation within said bearing, but it is held by the drum against downward movement.

At the left of the bearing $A^{10}$, and above the drum, $G^1$, is a housing, $A^{11}$, cast integral with the arm, $A^1$. On the left of said housing is the upright plate, $G^5$, secured to the housing by bolts, $G^6$. In said plate is a horizontal bearing, $G^7$, in axial alinement with the bearing, $A^{10}$. The shaft, H, rests in the bearing, $A^{10}$, and has a neck, $H^2$, extending through the bearing, $G^7$, and supporting a hand-wheel, $H^3$, at the left of said bearing.

On the upper edge of the drum, $G^1$, is a bevel gear crown, $G^8$, having upward directed teeth meshing with the teeth of a small bevel gear wheel, $G^9$, which is fixed on a horizontal shaft, $G^{10}$, rotatable in the bearing, $G^{11}$, which is stationary on the arm, $A^1$.

Said shaft is rotated at the will of the operator through mechanism to be described further on.

On the axial line of the turret, G, is an upright bore, $G^{12}$, extending through the turret body. In the upper part of said bore is an upright key way, $G^{13}$. In said bore is a cylindrical, reciprocatory cutter supporting stem, $G^{14}$, on which is a stud, $g^{13}$, extending into said key-way to prevent the stem from rotating independently of the turret body.

The upper end of said stem, $G^{14}$, extends upward above the turret, G, and through the drum $G^1$, and into the coupling member, $G^{17}$, and there has a cylindrical head, $G^{15}$, resting rotatably in the cylindrical bearing, $G^{16}$, formed in the lower part of said coupling member. Above said head, the coupling member, $G^{17}$, has right and left and front and rear parallel upright walls, $g^{17}$. Above the head $G^{15}$, a bearing member, $G^{18}$, rests on the horizontal faces, $g^{18}$, (Fig. 6), which surround the bearing, $G^{16}$. In said bearing member rests a cross arm, $G^{22}$, supported on the lower end of the pendulum or pitman, $G^{23}$, the upper end of which surrounds the eccentric, $H^1$, which forms a part of the shaft, H, within the housing, $A^{11}$. Two upper bearing members, $G^{19}$, rest on the bearing member, $G^{18}$, at opposite sides of the pitman, $G^{23}$. A binding plate, $G^{20}$, extends across the bearing member, $G^{19}$, and the walls, $g^{17}$, at each side of the pitman, and each of said binding plates is secured to said walls by bolts, $G^{21}$. By means of the coupling member, $G^{17}$, and said bearing members, the stem, $G^{14}$, is coupled to said pitman for up and down movement when the shaft, H, is rotated. The lower part of the stem, $G^{14}$, is guided by the turret, G, for up and down movement. The coupling member, $G^{17}$, is held to up and down movement by engagement of the walls, $g^{17}$, with the front and rear walls of the housing, $A^{11}$, and by engagement of the right hand face of the member, $G^{17}$, with the face, $A^{12}$, formed on the arm, $A^1$, and by engagement of the right hand end of the coupling member with the inner face of the upright wall plate, $G^5$. In other words, the front and rear walls of the housing, the face, $A^{12}$, and the wall plate, $G^5$, form a chamber which is upright and rectangular in horizontal cross section and wherein the coupling member, $G^{17}$, in confined for up-and-down non-rotary reciprocation.

It will now be seen that the up-and-down reciprocation of the cutter stem, $G^{14}$, is effected by the rotation of the shaft, H, while the turning of said stem on its axis is effected by the rotation of the bevel gear wheel, $G^9$, from which motion is transmitted to the bevel gear crown, $G^8$, which is formed on the drum, $G^1$, which is bolted to the turret, G. It is also to be observed that the stem, $G^{14}$, may be reciprocated whether the turret is at rest or being turned on its axis and regardless of the position into which the turret has been turned if it is at rest; and that the turret may be turned when the cutter stem is at any stage in its reciprocation or is at rest. The friction gearing hereinafter described for turning this turret allows slipping while the lower end of the cutter is in the sheet, S.

The shaft, H, is to be rotated by power applied thereto as hereinafter described. Said shaft may also be turned by the operator by engaging the hand wheel, $H^3$, which, as above described, is mounted on the neck, $H^2$. This wheel is to be used in this way when artificial power is not being applied to the shaft, H, and it is desired to assemble and adjust the cutting members.

A tubular cutter holder, $E^1$, is applied to the lower end of the stem, $G^{14}$, the holder having a neck, $E^2$, threaded into said stem. The stem, $G^{14}$, is also tubular from near the head, $G^{15}$, downward to the upper end of the neck, $E^2$. The cutter, E, is slidable endwise in the holder, $E^1$, and said stem when said cutter is not engaged by the horizontal taper pin, $E^3$, extending through the holder, $E^1$, and adapted to bear sidewise against the cutter. As a further means for holding the cutter against endwise movement, slugs, $E^4$, are placed above the cutter to fill the space between the upper end of the cutter and the upper end of the bore in which the cutter is confined. The slugs are made small enough in diameter to slide by gravity for removal from the stem, and said slugs are made of various lengths in order that, by selection, the space above the cutter may be filled with slugs when the lower end of the cutter is at the desired elevation relative to the cutting members which are located below the sheet plane.

The lower end of the cutter has an upright flat front face, e, as wide as the cut which is to be made. Perpendicular to said face and parallel to each other are the side faces, $e^1$. At the lower ends of these three faces are cutting edges. The lower end of the cutter is inclined upward proceeding from the front face rearward, so that the front cutting edge will make the first engagement with the sheet to be cut and so that the side cutting edges will be inclined and engage the sheet progressively from the front rearward. The front cutting edge works in opposition to the rear edge of the lower cutter, D. The left hand side cutting edge works in opposition to the lower cutter, $D^1$. The right hand side cutting edge works in opposition to the lower combined feed and cutter wheel, $B^{10}$, which is associated with the lower cutter bars, D and $D^1$, as already described.

The turret body, G, also supports a presser which is a part of the feed mechanism and coöperates with the feed roller, $B^{10}$, in engaging the metal sheet, S, for shifting the latter during the step-by-step turning of said roller. This presser and the parts associated therewith will now be described.

At one side of the bore, $G^{12}$, is an upright, cylindrical chamber, $G^{24}$, extending upward from the lower end of the turret. Said chamber is shown as extending only a little way above the middle of the length of the turret. From the upper end of said chamber and in axial alinement with the chamber a cylindrical bore, $G^{25}$, extends upward through the turret. The presser comprises a cylindrical stem, $G^{26}$, a lower horizontal bearing, $G^{32}$, and a wheel or roller, $G^{33}$.

In the lower part of the bore, $G^{12}$, the stem, $G^{26}$, is surrounded by a sleeve, $G^{27}$, said sleeve being threaded to said stem and being slidable endwise with the stem when the latter moves up and down. Between said sleeve and the shoulder, $G^{29}$, formed at the upper end of the chamber, $G^{24}$, is an expanding coiled spring, $G^{28}$, bearing against said shoulder and said sleeve and tending to press the latter downward. Threading said sleeve on the stem makes the sleeve adjustable endwise, whereby the action of the spring, $G^{28}$, may be varied. The bore, $G^{25}$, is of proper diameter to receive the stem, $G^{26}$, slidably. The inner face of the bore, $G^{25}$, has a longitudinal channel, $G^{30}$, which receives a tongue, $G^{31}$, formed on the stem. The engagement of said tongue in said groove prevents rotation while permitting reciprocation of the stem. The upper end of the stem extends upward through the bottom, $G^{2}$, of the drum, $G^{1}$, and is there associated with cam mechanism as will be described further on.

In the bearing, $G^{32}$, formed on the lower end of the stem, $G^{26}$, is a horizontal axle, $G^{34}$. The wheel or roller, $G^{33}$, is fixed on the end of said axle which is adjacent the axial line of the two turrets. Said axle projects through the opposite end of the bearing and there has a shoulder, $G^{35}$. The projecting end of the axle is threaded and receives a nut, $G^{36}$, which bears against said shoulder. Thus the axle is free for rotation when the wheel or roller, $G^{33}$, is turned by contact with the upper face of the moving sheet, S.

As already described, the lower feed roller, $B^{10}$, is also close to the axial line of the two turrets—in position to meet one of the faces of the reciprocatory cutter when the latter moves downward below the sheet, S. The turrets are so turned relatively on the axial line as to bring the wheel, $G^{33}$, directly above the lower feed roller, $B^{10}$; and, by means to be described farther on, the two turrets are to be turned in unison, whereby the relative positions of the wheel, $G^{33}$, and the roller, $B^{10}$, are maintained.

By turning the turret, G, the stem, $G^{26}$, and the wheel, $G^{33}$, will be carried around the common axis of the turret and the cutter stem, the presser wheel, $G^{33}$, moving in an orbital path which is concentric to said axis and which orbital path maintains a uniform relation to the orbital path in which the roller, $B^{10}$, is at the same time carried.

When the feed roller, $B^{10}$, is turned a step by the partial rotation of the shaft, $B^{15}$, the feed roller and the wheel, $G^{33}$, move the sheet, S, correspondingly. The direction of such movement will depend upon the direction of rotation of the feed roller and the position of roller and the wheel, $G^{33}$, in their orbital paths.

The roller, $B^{10}$, and the wheel, $G^{33}$, stand in an upright plane which is tangential to said orbital paths and the movement imparted to the sheet, S, is parallel to said plane. Said plane changes position and direction with the turning of the turrets. Hence by turning the turrets any desired direction may be given to the feed imparted to the sheet, S, by the joint action of the feed roller, $B^{10}$, and the presser wheel, $G^{33}$.

The drum, $G^{1}$, and the drum, $B^{6}$, already described as being attached to the lower end of the lower turret, B, are harnessed to each other for rotation in unison by means which will now be described.

On the front of the body, A, of the machine, at the right and at the level of the drum, $G^{1}$, is a guide pulley, $I^{2}$, mounted on an axis which is horizontal and perpendicular to the front of the machine. Below the pulley, $I^{2}$, and at the level of the drum, $B^{6}$, is a similar pulley, $I^{3}$, similarly mounted. On the rear face of the machine, and nearly opposite the pulley, $I^{2}$, is a similar pulley, $I^{6}$, similarly mounted, and nearly opposite the pulley, $I^{3}$, is a similar pulley, $I^{7}$, similarly mounted. The upper edge of the pulley, $I^{2}$, is on a level with the lower part of the drum, $G^{1}$, while the upper edge of the pulley, $I^{6}$, is on a level with the upper part of the drum, $G^{1}$, the part immediately below the gear crown, $G^{8}$. The lower edge of the lower pulley, $I^{3}$, is on a level with the lower part of the drum, $B^{6}$, while the lower edge of the rear pulley, $I^{7}$, is at a level with the upper part of the drum, $B^{6}$.

Immediately at the right of the drum, $B^{6}$, in a recess, $A^{13}$, are a pair of guide pulleys, $I^{4}$ and $I^{5}$, each being on an upright axis and the former being at the front and the latter at the rear of the upright, middle longitudinal plane of the machine. The pulley, $I^{4}$, is at the elevation of the lower half of the drum, $B^{6}$, and the pulley, $I^{5}$, is at the elevation of the upper half of said drum. A strap, $I^{1}$, has one end attached to the face of the lower half of the drum, $G^{1}$. Said strap is wound around the drum in the proper direction to leave the drum at the front and extend thence to and over the front guide pulley, $I^2$, and thence downward to and partially around the lower guide pulley, $I^3$, and thence over the front of the twin guide pulley, $I^4$, and partially around the latter and thence rearward and over the face of the lower half of the drum, $B^6$. Each end of said strap is wound sufficiently upon the adjacent drum, to allow winding and unwinding of the strap while the drums turn something more than one rotation and preferably a little more than two rotations. One end of a strap, $I^2$, is similarly applied to the upper half of the drum, $G^1$, but wound in the opposite direction, and extended thence rightward across the guide pulleys, $I^6$ and $I^7$, at the rear of the body of the machine and thence leftward and over the rear of the twin guide pulley, $I^4$, and thence forward and over the forward part of the upper half of the drum, $B^6$, and around the latter often enough to permit the desired rotation of the drum. Thus the two straps will cross each other between the pulleys, $I^4$ and $I^5$, and the drum, $B^6$.

The drums are to be of equal diameter, in order that the straps will turn the drums at the same speed.

The ends of the straps, I and $I^1$, may be attached to the respective drums in any suitable manner. But it is preferable to provide for adjustment of such attachment, in order that the turrets may be so turned with reference to each other as to bring the upper reciprocatory cutter and the lower cutting members into proper relation with each other—the right hand side of the reciprocatory cutter being placed parallel to the left hand face of the cutting and feeding roller, $B^{10}$, and the front lower edge of the reciprocatory cutter being brought parallel to the cutting edge of the stationary cutter bar, D.

On the interior of the lower drum, $B^6$, I place means for adjustably attaching the end of each strap. On the lower part of the interior face of the rim of said drum is a bracket, $I^8$, which is directed toward the axis of said drum and through which extends loosely a bolt, $I^9$. Said bolt also extends loosely through the arm, $I^{10}$, of a slide plate, $I^{11}$. (Figs. 25, 26 and 27). By means of a nut, $I^{12}$, on the bolt, $I^9$, the slide plate may be drawn toward the bracket, $I^8$. The plate, $I^{11}$, has a longitudinal slot, $I^{13}$, through which extends a binding screw, $I^{14}$; by means of which said plate may be bound to the rim of the drum after the bolt, $I^9$, has been adjusted. Opposite the arm, $I^{10}$, the rim of the drum has a slot, $I^{15}$. On the slide plate is an extension, $I^{16}$, which reaches through said slot even with the outer face of the drum. The slot is long enough to permit movement of said extension in the slot parallel to the length of the bolt, $I^9$. The adjacent end of each strap, extends around the drum to the appropriate extension, $I^{16}$, and is there secured by a screw, $I^{17}$, extending through the strap into the extension. In Fig. 26 is shown in detail how the front strap, I, is secured after going from the rear and the left to the front and then into the slot, $I^{15}$, over the right hand face of the extension, $I^{16}$. The bracket, $I^8$, is secured by screws, $I^{18}$, extending horizontally through the wall of the drum into the bracket. It will now be seen that by loosening the screw, $I^{14}$, and then turning the nut, $I^{12}$, for drawing the bolt, $I^9$, the entire slide plate, $I^{11}$, and the adjacent end of the strap will be drawn toward the bracket, $I^8$. When this movement has been carried to the desired extent, the binding screw, $I^{14}$, is to be again tightened.

It is to be remembered that on each of the drums, $G^1$ and $B^6$, the straps are applied in opposing directions.

The straps, I and $I^1$, are preferably made of a good quality of thin steel. As a substitute, braided or twisted wire or a single wire may be used. It is important to use a material which has a minimum of elasticity. For adjustment, either strap may be made longer than is necessary and then drawn by the appropriate bolt, $I^9$, until the strap is taut when the lower cutting mechanism is properly positioned relative to the upper reciprocatory cutter. Then the other bolt, $I^9$, may be drawn to tighten the adjacent strap.

For subsequent readjustment, the bolt toward which adjustment is to be made should be slightly loosened and the opposing bolt then drawn forward correspondingly.

As above stated, the upper turret, G, receives motion through engagement of the bevel gear crown, $G^8$, with the small bevel gear wheel, $G^9$, which is supported on a horizontal shaft, $G^{10}$, resting in a bearing, $G^{11}$, which is supported by the arm, $A^1$. On the outer end of said shaft is a small bevel gear wheel, $J^4$, which meshes with another small bevel gear wheel, $J^5$, which is mounted on a horizontal shaft, $J^6$, which is supported in a bearing, $J^7$, which bearing is fixed on the arm, $A^1$. On the shaft at the end of said bearing opposite the wheel, $J^5$, is fixed a hand wheel, $J^8$, by means of which said shaft may be rotated by the hand of the operator. Rearward of said hand wheel and on the front face of the body of the machine are a bearing, $J^{13}$, and a bearing, $J^{14}$. A shaft, $J^{12}$, rests in said bearings. A shaft, $J^{10}$, has its right hand end coupled to said shaft, $J^{12}$, by a universal coupling, $J^{11}$, and has its left hand end coupled to the right hand end of the shaft, $J^6$, by means of a universal coupling, $J^9$. Between the bearings, $J^{13}$ and $J^{14}$, the shaft, $J^{12}$, supports a friction gear wheel, $J^{15}$, said wheel being feathered on said shaft to permit endwise sliding and to compel rotation with said shaft.

The wheel, $J^{15}$, is positioned to have its perimeter bear against the front face of a disk wheel, $J^{16}$, which is mounted on a horizontal shaft, $J^{17}$, extending rearward through the body of the machine. On the rear end of said shaft is a pulley, $J^{18}$, which is to receive power from a belt not shown. (In Fig. 4 this pulley is omitted.) To a bracket, $J^{19}$, extending rearward from the body of the machine is coupled the left hand end of a lever, $J^{20}$, which is horizontal and parallel to the rear face of the machine. Between its ends, said lever is coupled in a well-known manner to the shaft, $J^{17}$, by means of a grooved collar, $J^{21}$, which is fixed on said shaft and receives a stud, $J^{22}$, on the lever, the latter surrounding said collar. On said shaft, between the body of the machine and said lever is a pulley, $J^{24}$. Between said pulley and the grooved collar, $J^{21}$, is an expanding coiled spring, $J^{25}$, which presses the arm, $J^{20}$, rearward, away from the body of the machine, when said arm is free. The pulley, $J^{24}$, is feathered on said shaft, so that the shaft may reciprocate endwise while the pulley still bears against a boss, $J^{26}$, formed on the rear face of the machine around said shaft. The arm, $J^{20}$, is drawn toward the front of the machine by means of a wire, $J^{27}$, extending over a guide pulley, $J^{28}$, mounted on the rear of the machine between two brackets, $J^{29}$, and thence downward to an arm, $J^{30}$. The arm, $J^{30}$, is fixed on a horizontal neck shaft, $J^{31}$, which extends horizontally forward through the machine and at its front and supports a pedal, $J^{32}$. When said pedal is depressed by the operator, said wire is drawn downward, whereby the arm, $J^{20}$, and the shaft, $J^{17}$, and the friction disk, $J^{16}$, are forced slightly forward until said disk is in engagement with the friction wheel, $J^{15}$.

Horizontal movement of the wheel, $J^{15}$, on the shaft, $J^{12}$, is effected by means which will be next described.

Said wheel has a leftward extended and circumferentially grooved hub. In the groove of the hub is a ring, $J^{33}$, on which are outward directed journals, $J^{34}$, which are engaged by the arms, $J^{35}$, of a fork, $J^{36}$, which is fixed on a horizontal bar, $J^{37}$, which is slidable endwise in horizontal bearings, $J^{38}$, extending forward on the bearings, $J^{13}$ and $J^{14}$. On the slide bar, $J^{37}$, is a handle, $J^{39}$, by means of which said bar may be moved endwise to shift the fork, $J^{36}$, whereby the friction wheel, $J^{15}$, is shifted parallel to the face of the friction disk, $J^{16}$. As above indicated, the disk, $J^{16}$, is normally at its rear position and out of contact with the wheel, $J^{15}$. When it is desired to rotate the wheel, $J^{15}$, and through the latter and intervening members, the crown bevel gear, $G^8$, for the rotation of the turret body, the disk, $J^{16}$, is brought forward and so held by pressure of the foot of the operator on the pedal, $J^{32}$. As soon as pressure upon the pedal is released, the spring, $J^{25}$, on the shaft, $J^{17}$, forces said shaft and the disk, $J^{16}$, rearward, whereupon rotation of the wheel, $J^{16}$, ceases. The direction of rotation of the wheel, $J^{15}$, will depend upon whether said wheel is at the right of or at the left of the axial line of the disk. Moving the wheel, $J^{15}$, farther from said axial line will increase the velocity imparted to said wheel. At and around said axial line said disk should be concaved sufficiently to avoid contact with the wheel, $J^{15}$, when said wheel is on said axial line.

The mechanism by means of which the upper feed presser may be lifted away from the sheet plane will now be described.

Within the drum, $G^1$, and on the upper end of the turret body rests a cam disk, L, said disk loosely surrounding the reciprocatory cutter stem, $G^{14}$, so that said disk is rotatable with said stem serving as an axle, and said stem being free to rotate independently of the cam disk when the turret body is rotated for the purpose of turning the reciprocatory cutter when it is desired to change the direction of the feed of the sheet, S.

On the upper face of said disk is a cam face, $L^2$, which is concentric with the disk axis and extends through such part of the circle as may be deemed desirable to give to the cam face a suitable pitch. The drawings show said cam face extending through approximately one-half of the circle. Along the middle of said cam face is a slot, $L^1$, extending downward through the disk. The upper end of the presser stem, $G^{26}$, extends upward through said slot. At each side of said stem is a roller, $L^4$, mounted for rotation on a cross pin, $L^5$, which extends transversely through the stem, $G^{26}$. The length of the stem, $G^{26}$, is such as to allow the presser stem to be at its lower limit and free to exert full pressure when the rollers, $L^4$, are at the lower end, $L^6$, of the cam face, and so as to cause the presser to be lifted fully to its upper limit when said rollers are at the upper end, $L^7$, of the cam face.

The perimeter of said disk is provided with gear teeth, $L^8$, which mesh with a pinion, $L^9$, which is fixed on the lower end of an upright shaft, $L^{10}$, which rests in a bearing, $L^{11}$, extending upward from within the pulley, I, and supported on the arm, $A^1$. Above said bearing the upper end of said shaft is surrounded by a bevel gear wheel, $L^{12}$, which meshes with a bevel gear wheel, $L^{13}$, which is mounted on the left hand end of a horizontal shaft, $L^{14}$, in fixed bearings, $L^{15}$, $L^{16}$ and $L^{17}$.

Above and parallel to the shaft, $J^{17}$, is a shaft, $L^{18}$, extending through and rotatable in the body of the machine. Fixed on the front of said shaft is a friction bevel gear, $L^{19}$. On the shaft, $L^{14}$, and at each side of the axis of the wheel, $L^{19}$, is a friction bevel wheel, $L^{20}$. Said wheels are joined in a common hub, $L^{21}$, which spaces said wheels so that both may be out of engagement with the bevel wheel, $L^{19}$, and so that either of said wheels may be brought into engagement with the wheel, $L^{19}$, according to the direction in which said hub and wheels, $L^{20}$, are moved. Between the right hand wheel, $L^{20}$, and the bearing, $L^{17}$, is an expanding coiled spring, $L^{22}$, which tends to press the wheels, $L^{20}$, and the hub, $L^{21}$, leftward. At the left of the left hand wheel, $L^{20}$, is a hub extension, $L^{23}$. Between said extension and the bearing, $L^{16}$, is an expanding coiled spring, $L^{24}$, which tends to press the hub and the wheels, $L^{20}$, rightward. Within each of the bearings, $L^{16}$ and $L^{17}$, is a bushing, $L^{25}$, having a hexagonal flange, $L^{26}$, bearing against the adjacent spring. Each bushing is threaded into the adjacent bearing. By turning said bushing, pressure upon the adjacent spring may be varied. By means of said springs, and said adjustable bushings, the wheels, $L^{20}$, may be so engaged as to hold both at rest in neutral position or out of engagement with the wheel, $L^{19}$.

In the hub extension, $L^{23}$, is a circumferential groove in which rests a ring, $L^{27}$, on which are two outward directed journals, $L^{28}$, which are engaged by the arms, $L^{29}$, of a fork, $L^{30}$, which is fixed on a horizontal rock shaft, $L^{31}$, which extends rearward through bearings, $L^{32}$, formed in the top of the body of the machine. Between the fork and the forward bearing, $L^{32}$, a horizontal cross arm, $L^{33}$, is fixed on said shaft. A wire, $L^{34}$, extends over guide pulleys, $L^{35}$ and $L^{36}$, and through a guide, $L^{37}$, to a pedal, $L^{40}$, said pulleys and guide being seated on the front of the body of the machine. From the right hand end of the cross arm a wire, $L^{39}$, extends downward through the guide, $L^{37}$, to the pedal, $L^{38}$. The pedals, $L^{38}$ and $L^{40}$, are made rigid on a common horizontal shaft, $L^{41}$, so that the two pedals must move in unison, one going up while the other goes down, the wires $L^{34}$ and $L^{39}$, moving simultaneously in opposite directions. Depressing the left hand end of the cross arm, $L^{33}$, will cause the fork, $L^{30}$, to shift the bevel wheels, $L^{20}$, rightward, whereby the left hand wheel, $L^{20}$, will be pressed into engagement with the bevel wheel, $L^{19}$.

Tilting the cross arm, $L^{33}$, in the opposite direction will bring the other wheel, $L^{20}$, into engagement with the bevel wheel, $L^{19}$. When both pedals, $L^{38}$ and $L^{40}$, are free, the springs, $L^{22}$ and $L^{24}$, will hold the wheels, $L^{20}$, in neutral position. On the rear end of the shaft, $L^{18}$, which supports the bevel friction wheel, $L^{19}$, is a pulley, $L^{42}$. A belt, $L^{43}$, surrounds said pulley and the pulley, $J^{24}$, which has already been described as being mounted on the shaft, $J^{17}$, on the forward end of which is the friction disk, $J^{16}$. By means of this belt, the shaft, $L^{18}$, receives motion from the shaft, $J^{17}$.

On the shaft, $L^{14}$, between the bearings, $L^{15}$ and $L^{16}$, is a hand wheel, $L^{44}$, by means of which the operator may manually turn said shaft when the shaft, $J^{17}$, is idle.

Since the upper turret, G, and the lower turret, B, are to be rotated and the presser stem, $G^{26}$, is to be lifted out of action independently of the reciprocation of the upper cutting member and the rotation of the lower feed wheel on its horizontal axis, power is to be transmitted continuously to the pulley, $J^{18}$, on the shaft, $J^{17}$, and independently of the application of power to the shaft, H, from which the reciprocatory cutter and the lower feed wheel are driven.

The shaft, H, is supported in the bearing, $A^{10}$, and the bearing, $A^{14}$, on the right hand part of the body, A, and a bearing, $F^{2}$, on the upper end of the standard, F, supports the right hand end of said shaft.

Said shaft is driven by means which will now be described.

In a bearing, $A^{15}$, on the body, A, and in a bearing, $F^{3}$, in the standard, F, secured to the body of the machine by bolts, $F^{1}$, is a drive shaft, $F^{4}$, on which is a band wheel, $F^{5}$, which receives rotation continuously from a band (not shown). Immediately at the left of the standard, F, a fly wheel, $F^{6}$, surrounds and is fixed on said shaft. Between said wheel and the bearing, $A^{15}$, a small spur gear wheel, $F^{7}$, surrounds said shaft and is rigid thereon. Meshing with said spur gear wheel and loosely surrounding the shaft, H, is a larger spur gear wheel, $F^{8}$, which has at its left a clutch member, $F^{9}$, which is adapted to make engagement with the clutch member, $F^{10}$, which is feathered on said shaft. A bell-crank, $F^{11}$—$F^{12}$, is supported in the bearing, $A^{16}$, above the clutch member, $F^{10}$. The arm, $F^{11}$, of said bell crank is forked and engages the clutch ring, $f^{10}$, which surrounds the clutch member, $F^{10}$. By rocking said bell crank, the clutch member, $F^{10}$, is moved into and out of engagement with the clutch member, $F^{9}$. When said clutch members are in engagement, the rotation of the spur gear wheel, $F^{8}$, compels the rotation of the clutch member, $F^{10}$, and the rotation of that member compels the rotation of the shaft, H, in a manner familiar to the art. A connecting rod, $F^{13}$, extends slidably through a bearing, $A^{17}$, on the body, A, and has its upper end coupled to the arm, $F^{12}$, of the bell crank while its lower end is coupled to an arm $F^{14}$. An expanding coiled spring, $F^{15}$, surrounds said rod between the bearing, $A^{17}$, and the arm, $F^{12}$.

Said spring tends to push the arm, $F^{12}$, upward, whereby the arm, $F^{11}$, of the bell crank is moved toward the left—the direction for disengaging the clutch member, $F^{10}$, from the clutch member, $F^9$. Hence said clutch is normally out of engagement and the shaft, H, is normally at rest. The arm, $F^{14}$, is rigid on a rock shaft, $F^{16}$, which is supported in the right hand portion of the body, A, close to the base, $A^3$. An arm, $F^{17}$, is rigid on said rock shaft and extends horizontally to the left hand end of the machine and is adapted to there extend below and into engagement with the lug, $F^{18}$, projecting forward on the body of the machine. The arm, $F^{17}$, has sufficient flexibility to adapt it to be moved by the foot of the operator into and out of engagement with the lug, $F^{18}$.

When the operator desires to have the shaft, H, rotate for the reciprocation of the upper cutter, E, he presses his foot downward on the left hand end of the arm, $F^{17}$, far enough to move the clutch member, $F^{10}$, into engagement with the clutch member, $F^9$. If the cutter, E, is to make only one or some other small number of strokes, the operator holds the arms, $F^{17}$, without causing it to make engagement with the lug, $F^{18}$. If the cutter is to be reciprocated an indefinite number of times, the operator may press the arm, $F^{17}$, into engagement with the lug, $F^{18}$, and there leave said arm until the reciprocation of the cutter is to be stopped.

I claim as my invention,

1. In a machine for cutting sheet-form material, the combination of a body rotatable on an upright axis and having a horizontal, upward-directed supporting face close to the below-mentioned reciprocatory cutter path, a reciprocatory cutter perpendicular to and above said supporting face and having lateral cutting edge portions extending to two lines which are parallel to each other and to the course of the sheet, and two members, standing in opposition to each other and adapted to receive a sheet between them and one being supported on said body and one being driven, for supporting and feeding said sheet and forming a turning point therefor near the path of the reciprocatory cutter, and a cutter stationary on said rotatable body and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

2. In a machine for cutting sheet-form material, the combination of a body rotatable on an upright axis and having a horizontal, upward-directed supporting face close to the below-mentioned reciprocatory cutter path, a reciprocatory cutter perpendicular to and above said supporting face and having lateral cutting edge portions extending to two lines which are parallel to each other and to the course of the sheet, and two members, standing in opposition to each other and adapted to receive a sheet between them and one being supported on said body for supporting and feeding said sheet and forming a turning point therefor near the path of the reciprocatory cutter, and a cutter stationary on said rotatable body and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, means for turning said upper body, and means for driving said lower feed member, substantially as described.

3. In a machine for cutting sheet-form material, the combination of a body rotatable on an upright axis and having a horizontal, upward-directed supporting face close to the below-mentioned reciprocatory cutter path, two members, standing in opposition to each other and adapted to receive a sheet between them and one being supported on said body and being rotary and driven, for supporting and feeding said sheet and forming a turning point therefor, a reciprocatory cutter perpendicular to and above said supporting face and having a path passing through the plane of said sheet near said turning point and said cutter having lateral cutting edge portions extending to two lines which are parallel to each other and to the course of the sheet, and a cutter stationary on said rotatable body and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

4. In a machine for cutting sheet-form material, the combination of a body rotatable on an upright axis and having a horizontal, upward-directed supporting face close to the below-mentioned reciprocatory cutter path, two members, standing in opposition to each other and adapted to receive a metal sheet between them and one being supported on said body and being rotary for supporting and feeding said sheet and forming a turning point therefor, a reciprocatory cutter perpendicular to and above said supporting face and having a path passing through the plane of said sheet near said turning point and said cutter having lateral cutting edge portions extending to two lines which are parallel to each other and to the course of the sheet, and a cutter stationary on said rotatable body and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, means for turning said upper body, and means for driving the lower feed member, substantially as described.

5. In a machine for cutting sheet-form material, the combination of a body rotatable on an upright axis and having a horizontal, upward-directed supporting face close to the below-mentioned reciprocatory cutter path, two rotary members, standing near said supporting face and in opposition to each other and adapted to receive a sheet between them and one being driven, for supporting and feeding said sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a cutter stationary on said rotatable body and below the sheet plane and rising to the level of the upper part of the lower feed member and having its working part receiving support from said supporting face close to said path, means for turning said rotatable body, an upper body rotatable on the axial line of the lower body and supporting said reciprocatory cutter, and means for turning said upper body, substantially as described.

6. In a machine for cutting sheet-form material, the combination of a body rotatable on an upright axis and having a horizontal, upward-directed supporting face close to the below-mentioned reciprocatory cutter path, two rotary members, standing near said supporting face and in opposition to each other and adapted to receive a sheet between them and one being supported on said body and being driven, for supporting and feeding said sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and a cutter stationary on said rotatable body and located below the sheet plane and rising to the level of the upper part of the lower feed member and adapted to work in conjunction with the reciprocatory cutter and having its working part receiving support from said supporting face close to said path, means for positioning and securing said stationary cutter, means for turning said rotatable body, an upper body rotatable on the axial line of the lower body and supporting said reciprocatory cutter, and means for turning said upper body, substantially as described.

7. In a machine for cutting sheet-form material, the combination of a body rotatable on an upright axis and having a horizontal, upward-directed supporting face close to the below-mentioned reciprocatory cutter path, two rotary members, standing near said supporting face and in opposition to each other and adapted to receive a sheet between them and one being supported on said body and being driven, for supporting and feeding said sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines and one of which edge portions is adapted to work in conjunction with the lower of said rotary feed members for cutting, and two cutters stationary on said rotatable body and located below the sheet plane and rising to the level of the upper part of the lower feed member and adapted to work in conjunction with the reciprocatory cutter and having their working parts receiving support from said supporting face close to said path, means for turning said rotatable body, an upper body rotatable on the axial line of the lower body and supporting said reciprocatory cutter, and means for turning said upper body, substantially as described.

8. In a machine for cutting sheet-form material, the combination of a body rotatable on an upright axis and having a horizontal, upward-directed supporting face close to the below-mentioned reciprocatory cutter path, a foundation bar resting on said supporting face close to said path, a reciprocatory cutter perpendicular to and above said supporting face and having lateral cutting edge portions extending to two lines which are parallel to each other and to the course of the sheet, and two members, standing in opposition to each other and adapted to receive a sheet between them and one being supported on said body and being driven, for supporting and feeding said sheet and forming a turning point therefor near the path of the reciprocatory cutter, and a cutter stationary on said rotatable body and having its working part resting upon said foundation bar close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

9. In a machine for cutting sheet-form material, the combination of a body rotatable on an upright axis and having a horizontal, upward-directed supporting face close to the below-mentioned reciprocatory cutter path, a foundation bar resting on said supporting face close to said path, two members, standing in opposition to each other and adapted to receive a sheet between them and one being supported on said body and being rotary and driven, for supporting and feeding said sheet and forming a turning point therefor, a reciprocatory cutter perpendicular to and above said supporting face and having a path passing through the plane of said sheet near said turning point and said cutter having lateral edge cutting portions extending to the lines which are parallel to each other and to the course of the path, and a cutter stationary on said rotatable body and having its working part resting upon said foundation bar close to the path of the reciprocatory cutter, means for turning said rotatable body, an upper body rotatable on the axial line of the lower body and supporting said reciprocatory cutter, and means for turning said upper body, substantially as described.

10. In a machine for cutting sheet-form material, the combination of a body rotatable on an upright axis and having a horizontal, upward-directed supporting face close to the below-mentioned reciprocatory cutter path, a foundation bar resting on said supporting face close to said path, two rotary members, standing near said supporting face and in opposition to each other and adapted to receive a sheet between them and one being supported by said body and driven, for supporting and feeding said sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a cutter stationary on said rotatable body and having its working part resting upon said foundation bar close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

11. In a machine for cutting sheet-form material, the combination of a lower body rotatable on an upright axis and having walls forming an upright chamber, a lower roller located in said chamber, walls forming a horizontal channel adjacent said roller, walls forming an upright channel having its upper end communicating with said horizontal channel and being open at its lower end, an upright reciprocatory cutter, a cutter stationary on said rotatable body and working in conjunction with the reciprocatory cutter, means for turning said rotatable body, an upper body rotatable on the axial line of the lower body and supporting said reciprocatory cutter, and means for turning said upper body, substantially as described.

12. In a machine for cutting sheet-form material, the combination of a lower body rotatable on an upright axis and having walls forming an upright chamber, a lower roller located in said chamber, walls forming a horizontal channel adjacent said roller, walls forming an upright channel having its upper end communicating with said horizontal channel, walls forming a discharge passage communicating with said chamber and said upright channel, an upright reciprocatory cutter, a cutter stationary on said rotatable body and working in conjunction with the reciprocatory cutter, means for turning said rotatable body, an upper body rotatable on the axial line of the lower body and supporting said reciprocatory cutter, and means for turning said upper body, substantially as described.

13. In a machine for cutting sheet-form material, the combination of a lower body rotatable on an upright axis and having walls forming an upright chamber, a lower roller located in said chamber, walls forming a horizontal channel adjacent said roller, a foundation bar located in said horizontal channel and having a channel in line with the path of the below-mentioned reciprocatory cutter, walls forming an upright channel having its upper end communicating with the channel of the foundation bar and having its lower end open, an upright reciprocatory cutter, and a cutter stationary on said foundation bar and working in conjunction with said reciprocatory cutter bar, means for turning said rotatable body, an upper body rotatable on the axial line of the lower body and supporting said reciprocatory cutter, and means for turning said upper body, substantially as described.

14. In a machine for cutting sheet-form material, the combination of a machine body, a chair seated on said body and rotatable on an upright axis and having a horizontal, upward-directed supporting face close to the below-mentioned reciprocatory cutter path, a reciprocatory cutter perpendicular to and above said supporting face and having lateral cutting edge portions extending to two lines which are parallel to each other and to the course of the sheet, and two members, standing in opposition to each other and adapted to receive a sheet between them and one being supported on said chair and driven, for supporting and feeding said sheet and forming a turning point therefor near the path of the reciprocatory cutter, and a cutter stationary on said chair and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

15. In a machine for cutting sheet-form material, the combination of a machine body, a chair seated on said body and rotatable on an upright axis and having a horizontal, upward-directed supporting face close to the below-mentioned reciprocatory cutter path, two members, standing in opposition to each other and adapted to receive a sheet between them and one being supported on said chair and rotary and driven, for supporting and feeding said sheet and forming a turning point therefor, a reciprocatory cutter perpendicular to and above said supporting face and having a path passing through the plane of said sheet near said turning point and said cutter having lateral cutting edge portions extending to two lines which are parallel to each other and to the course of the sheet, and a cutter stationary on said chair and having its working part receiving support from said supporting face and being close to the path of the reciprocatory cutter, means for positioning and securing said stationary cutter, means for turning said rotatable body, an upper body rotatable on the axial line of the lower body and supporting said reciprocatory cutter, and means for turning said body, substantially as described.

16. In a machine for cutting sheet-form material, the combination of a machine body, a chair seated on said body and rotatable on an upright axis and having a horizontal, upward-directed supporting face close to the below-mentioned reciprocatory cutter path, two rotary members, standing near said supporting face and in opposition to each other and adapted to receive a sheet between them and one being supported on said chair and driven, for supporting and feeding said sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, a cutter stationary on said chair and located below the sheet plane and rising to the level of the upper part of the lower feed member and having its working part receiving support from said supporting face close to said path, means for turning said rotatable body, an upper body rotatable on the axial line of the lower body and supporting said reciprocatory cutter, and means for turning said upper body, substantially as described.

17. In a machine for cutting sheet-form material, the combination of a machine body, a chair seated on said body and rotatable on an upright axis and having a horizontal, upward-directed supporting face close to the below-mentioned reciprocatory cutter path, two rotary members, standing near said supporting face and in opposition to each other and adapted to receive a sheet between them and one being supported on said chair and driven, for supporting and feeding said sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and a cutter stationary on said chair and located below the sheet plane and rising to the level of the upper part of the lower feed member and adapted to work in conjunction with the reciprocatory cutter and having its working part receiving support from said supporting face close to said path, means for positioning and securing said stationary cutter, means for turning said rotatable body, an upper body rotatable on the axial line of the lower body and supporting said reciprocatory cutter, and means for turning said upper body, substantially as described.

18. In a machine for cutting sheet-form material, the combination of a machine body, a chair seated on said body and rotatable on an upright axis and having a horizontal, upward-directed supporting face close to the below-mentioned reciprocatory cutter path, two rotary members, standing near said supporting face and in opposition to each other and adapted to receive a sheet between them and one being located on said chair and driven, for supporting and feeding said sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and two cutters stationary on said chair and below the sheet plane and rising to the level of the upper part of the lower feed member and adapted to work in conjunction with the reciprocatory cutter and having their working parts receiving support from said supporting face close to said path, means for turning said rotatable body on the axial line of the lower body and supporting said reciprocatory cutter, and means for turning said upper body, substantially as described.

19. In a machine for cutting sheet-form material, the combination of a machine body, a chair seated on said body and rotatable on an upright axis and having a horizontal, upward-directed supporting face close to the below-mentioned reciprocatory cutter bar, a foundation bar resting on said supporting face close to said path, a reciprocatory cutter perpendicular to and above said supporting face and having lateral cutting edge portions extending to two lines which are parallel to each other and to the course of the sheet, and two members, standing in opposition to each other and adapted to receive a sheet between them and one being supported on said chair and driven, for supporting and feeding said sheet and forming a turning point therefor near the path of the reciprocatory cutter, and a stationary cutter located on said chair and having its working part resting upon said foundation bar close to the path of the reciprocatory cutter, means for positioning and securing said stationary cutter, means for turning said rotatable body, an upper body rotatable on the axial line of the lower body and supporting said reciprocatory cutter, and means for turning said upper body, substantially as described.

20. In a machine for cutting sheet-form material, the combination of a machine body, a chair seated on said body and rotatable on an upright axis and having a horizontal, upward-directed supporting face close to the below-mentioned reciprocatory cutter path, two members, standing in opposition to each other and adapted to receive a sheet between them and one being located on the chair and rotary and driven, for supporting and feeding said sheet and forming a turning point therefor, a reciprocatory cutter perpendicular to and above said supporting face and having a path passing through the plane of said sheet near said turning point and said cutter having lateral edge cutting portions extending to two lines which are parallel to each other and to the course of the path, and a cutter stationary on said chair and having its working part resting upon said foundation bar close to the path of the reciprocatory cutter, means for turning said rotatable body, an upper body rotatable on the axial line of the lower body and supporting said reciprocatory cutter, and means for turning said upper body, substantially as described.

21. In a machine for cutting sheet-form material, the combination of a machine body, a chair seated on said body and rotatable on an upright axis and having a horizontal, upward-directed supporting face close to the below-mentioned reciprocatory cutter path, a foundation bar resting on said supporting face close to said path, two rotary members, standing near said supporting face and in opposition to each other and adapted to receive a sheet between them and one being on said chair and driven, for supporting and feeding said metal sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a cutter stationary on said chair and having its working part resting upon said foundation bar close to the path of the reciprocatory cutter, and means for positioning and securing said stationary cutter, substantially as described.

22. In a machine for cutting sheet-form material, the combination of a chair rotatable on an upright axial line and having walls forming an upright chamber, a lower roller located in said chamber, walls forming a horizontal channel adjacent said roller, walls forming an upright channel having its upper end communicating with said horizontal channel and being open at its lower end, and means for rotating said chair, substantially as described.

23. In a machine for cutting sheet-form material, the combination of a chair rotatable on an upright axial line and having walls forming an upright chamber, a lower roller located in said chamber, walls forming a horizontal channel adjacent said roller, a foundation bar located in said horizontal channel and having a channel in line with the path of the below-mentioned reciprocatory cutter, walls forming an upright channel having its upper end communicating with the channel of the foundation bar and having its lower end open, an upright reciprocatory cutter, a cutter stationary on the foundation bar, and means for turning said chair, substantially as described.

24. In a machine for cutting sheet-form material, the combination of a machine body, a chair supported on said body for rotation on an upright axial line, a horizontal, rotary shaft on the chair, a lower feed roller located on said shaft adjacent the path of the below-mentioned reciprocatory cutter, an upper feed member adapted to work in conjunction with said roller for feeding a sheet, a reciprocatory cutter having a path perpendicular to the sheet plane, a cutter stationary on the chair and adapted to work in conjunction with the reciprocatory cutter near the place of engagement of the feed members, a gear wheel on said shaft, a gear member concentric to said axial line and in operative relation with the gear wheel on said shaft, and means for imparting to said concentric gear member a step-by-step rotation, substantially as described.

25. In a machine for cutting sheet-form material, the combination of a machine body, a chair supported on said body for rotation on an upright axial line, a horizontal, rotary shaft on the chair, a lower feed roller located on said shaft adjacent the path of the below-mentioned reciprocatory cutter, an upper feed member adapted to work in conjunction with said roller for feeding a sheet, a reciprocatory cutter having a path perpendicular to the sheet plane, a cutter stationary on the chair and adapted to work in conjunction with the reciprocatory cutter near the place of engagement of the feed members, a gear wheel on said shaft, a gear member concentric to said axial line and in operative relation with the gear wheel on said shaft, and automatic means for imparting to said concentric gear member a step-by-step rotation, substantially as described.

26. In a machine for cutting sheet-form material, the combination of a machine body, a chair supported on said body for rotation on an upright axial line, a horizontal, rotary shaft on the chair, a lower feed roller located on said shaft adjacent the path of the below-mentioned reciprocatory cutter, an upper feed member adapted to work in conjunction with said roller for feeding a sheet, a reciprocatory cutter having a path perpendicular to the sheet plane, power mechanism for actuating said cutter, a cutter stationary on the chair and adapted to work in conjunction with the reciprocatory cutter near the place of engagement of the feed members, a gear wheel on said shaft, a gear member concentric to said axial line and in operative relation with the gear wheel on said shaft, and power-actuated ratchet mechanism for imparting to said concentric gear member a step-by-step rotation, said ratchet mechanism being operator-controlled independently of the reciprocatory cutter actuating mechanism, substantially as described.

27. In a machine for cutting sheet-form material, the combination of a machine body, a chair supported on said body for rotation on an upright axial line, a horizontal, rotary shaft on the chair, a lower feed roller located on said shaft adjacent the path of the below-mentioned reciprocatory cutter, an upper feed member adapted to work in conjunction with said roller for feeding a sheet, a reciprocatory cutter having a path perpendicular to the sheet plane, power mechanism for actuating said cutter, a cutter stationary on the chair and adapted to work in conjunction with the reciprocatory cutter near the place of engagement of the feed members, a gear wheel on said shaft, a gear member concentric to said axial line and in operative relation with the gear wheel on said shaft, power-actuated, operator-controlled ratchet mechanism for imparting to said concentric gear member a step-by-step rotation, and operator-controlled means for normally holding said ratchet mechanism out of action, said means being independent of the reciprocatory cutter actuating mechanism, substantially as described.

28. In a machine for cutting sheet-form material, the combination of a machine body, a chair supported on said body for rotation on an upright axial line, a horizontal, rotary shaft on the chair, a lower feed roller located on said shaft adjacent the path of the below-mentioned reciprocatory cutter, an upper feed member adapted to work in conjunction with said roller for feeding a sheet, a reciprocatory cutter having a path perpendicular to the sheet plane, power mechanism for actuating said cutter, a cutter stationary on the chair and adapted to work in conjunction with the reciprocatory cutter near the place of engagement of the feed members, power-actuated means for imparting to said shaft a step-by-step rotation, and operator-controlled means for normally holding said power-actuated means out of action, said operator-controlled means being independent of the reciprocatory cutter actuating mechanism, substantially as described.

29. In a machine for cutting sheet-form material, the combination of a machine body, a chair supported on the body and rotatable on an upright axial line, a horizontal, rotary shaft on the chair, a lower feed roller on said shaft, an upper feed member adapted to work in conjunction with said roller for feeding a sheet, a reciprocatory cutter perpendicular to the sheet plane and having lateral cutting edge portions extending to two lines which are parallel to each other and to the course of the sheet, a cutter stationary on the chair and adapted to work in conjunction with the reciprocatory cutter near the place of engagement of the feed members, and adjustable means for imparting to said shaft a varied step-by-step rotation, substantially as described.

30. In a machine for cutting sheet-form material, the combination of a machine body, a chair supported on the body and rotatable on an upright axial line, a horizontal, rotary shaft on the chair, a lower feed roller on said shaft, an upper feed member adapted to work in conjunction with said roller for feeding a sheet, a reciprocatory cutter perpendicular to the sheet plane and having lateral cutting edge portions extending to two lines which are parallel to each other and to the course of the sheet, a drive shaft in operative relation with said reciprocatory cutter, a cutter stationary on the chair and adapted to work in conjunction with the reciprocatory cutter near the place of engagement of the feed members, and operator-controlled means intermediate said drive shaft and said feed roller shaft for imparting from said drive shaft to said feed roller shaft a step-by-step rotation, substantially as described.

31. In a machine for cutting sheet-form material, the combination of a machine body, a chair supported on the body and rotatable on an upright axial line, a horizontal, rotary shaft on the chair, a lower feed roller on said shaft, an upper feed member adapted to work in conjunction with said roller for feeding a sheet, a reciprocatory cutter perpendicular to the sheet plane and having lateral cutting edge portions extending to two lines which are parallel to each other and to the course of the sheet, a drive shaft in operative relation with said reciprocatory cutter, a cutter stationary on the chair and adapted to work in conjunction with the reciprocatory cutter near the place of engagement of the feed members, and adjustable, operator-controlled means intermediate said drive shaft and said feed roller shaft for imparting from said drive shaft to said feed roller shaft a step-by-step rotation, substantially as described.

32. In a machine for cutting sheet-form material, the combination of a machine body, a chair supported on the body and rotatable on an upright axial line, a horizontal, rotary shaft on the chair, a lower feed roller on said shaft, an upper feed member adapted to work in conjunction with said roller for feeding a sheet, a reciprocatory cutter perpendicular to the sheet plane and having lateral cutting edge portions extending to two lines which are parallel to each other and to the course of the sheet, a drive shaft in operative relation with said reciprocatory cutter, a cutter stationary on the chair and adapted to work in conjunction with the reciprocatory cutter near the place of engagement of the feed members, operator-controlled means intermediate said drive shaft and said feed roller shaft for imparting from said drive shaft and said feed roller shaft a step-by-step rotation, and operator-controlled means normally preventing transmission of motion from said drive shaft to said roller shaft, substantially as described.

33. In a machine for cutting sheet-form material, the combination with a machine body, of a turret rotatable on an upright axial line, a chair supported upon and rotatable with said turret, cutting means and feed means supported on said chair below the sheet plane, means for actuating said feed means, and power-actuated operator-controlled means for rotating said turret whereby said chair is rotated on the axial line of the turret, substantially as described.

34. In a machine for cutting sheet-form material, the combination with a machine body, of a turret rotatable on an upright axial line, a chair detachably supported upon and rotatable with said turret, cutting means and feed means supported on said chair below the sheet plane, means for actuating said feed means, and power-actuated operator-controlled means for rotating said turret, whereby said chair is rotated on the axial line of the turret, substantially as described.

35. In a machine for cutting sheet-form material, the combination with a machine body, of a turret rotatable on an upright axial line, a chair supported upon and rotatable with said turret, the turret and the chair being open along the axial line, cutting means and feed means supported on said chair below the sheet plane, means for actuating said feed means, and power-actuated operator-controlled means for rotating said turret whereby said chair is rotated on the axial line of the turret, substantially as described.

36. In a machine for cutting sheet-form material, the combination with a machine body, of a turret rotatable on an upright axial line, a chair detachably supported upon and rotatable with said turret, the turret and the chair being open along the axial line, cutting means and feed means supported on said chair below the sheet plane, means for actuating said feed means and means for rotating said turret, whereby said chair is rotated on the axial line of the turret, substantially as described.

37. In a machine for cutting sheet-form material, the combination with a machine body, of a turret rotatable on an upright axial line, a chair supported on said turret, the turret and the chair being open along the axial line, the meeting faces of the turret and the chair being formed for interengagement, whereby the chair is rotated when the turret is rotated, means for rotating said turret, and feed means and cutting means supported on the chair, substantially as described.

38. In a machine for cutting sheet-form material, the combination with a machine body, of a support rotatable on an upright axis, a rotatable feed member on said support, operator-controlled power means for rotating said support, operator-controlled power means for imparting to said rotatable feed member a step-by-step motion, and operator-controlled means normally holding said imparting means out of action, whereby said support is normally free to be rotated, substantially as described.

39. In a machine for cutting sheet-form material, the combination with a machine body, of a support rotatable on an upright axis, a rotatable feed member on said support, operator-controlled power means for rotating said support, operator-controlled, power-actuated ratchet mechanism for imparting to said rotatable feed member a step-by-step motion, and operator-controlled means associated with and normally holding said ratchet mechanism out of action, whereby said support is normally free to be rotated, substantially as described.

40. In a machine for cutting sheet-form material, the combination with a machine body, of a support rotatable on an upright axis, a rotatable feed member on said support, operator-controlled power means for rotating said support, operator-controlled, power actuated ratchet mechanism for imparting to said rotatable feed member a step-by-step motion, and an operator-controlled fender ring bearing a fender and said ring being normally positioned to bring the fender into position to hold the ratchet mechanism out of action, substantially as described.

41. In a machine for cutting sheet-form material, the combination with the body of the machine of a lower turret and an upper turret on a common axial line, cutting mechanism and sheet feeding mechanism supported by each of said turrets on the axial line of the turrets, operator-controlled, and power-actuated means for imparting rotation to said turrets, substantially as described.

42. In a machine for cutting sheet-form material, the combination with the body of the machine of a lower turret and an upper turret on a common axial line, cutting mechanism and sheet-feeding mechanism supported by each of said turrets on the axial line of the turrets, operator-controlled, power-actuated means for imparting rotation to one of said turrets, and means for transmitting motion from said turret to the other turret, substantially as described.

43. In a machine for cutting sheet-form material, the combination with the body of the machine, of a lower turret and an upper turret on a common axial line, cutting mechanism and sheet feeding mechanism supported by each of said turrets on the axial line of the turrets, and operator-controlled, reversible, power-actuated means for imparting rotation to said turrets, substantially as described.

44. In a machine for cutting sheet-form material, the combination with the body of the machine, of a lower turret and an upper turret on a common axial line, cutting mechanism and sheet feeding mechanism supported by each of said turrets on the axial line of the turrets, operator-controlled, reversible, power-actuated means for imparting rotation to one of said turrets, and means for transmitting motion from said turret to the other turret, substantially as described.

45. In a machine for cutting sheet-form material, the combination with the body of the machine, of a lower turret and an upper turret on a common axial line, cutting mechanism and sheet feeding mechanism supported by each of said turrets on the axial line of the turrets, and operator-controlled, power-actuated means comprising friction gearing for imparting rotation to said turrets, substantially as described.

46. In a machine for cutting sheet-form material, the combination with the body of the machine, of a lower turret and an upper turret on a common axial line, cutting mechanism and sheet feeding mechanism supported by each of said turrets on the axial line of the turrets, operator - controlled, power-actuated means comprising reversible friction gearing, for imparting rotation to said turrets, substantially as described.

47. In a machine for cutting sheet-form material, the combination with the body of the machine, of a lower turret and an upper turret on a common axial line, cutting mechanism and sheet feeding mechanism supported by each of said turrets on the axial line of the turrets, and operator-controlled, power-actuated means, comprising a continuously rotated shaft, for imparting rotation to said turrets, and a separately operator-controlled drive-shaft in operative relation with the cutting mechanism supported by the upper turret for actuating said cutting mechanism, substantially as described.

48. In a machine for cutting sheet-form material, the combination with the body of the machine, of a lower turret and an upper turret on a common axial line, cutting mechanism and sheet feeding mechanism supported by each of said turrets on the axial line of the turrets, operator-controlled, power-actuated means for imparting rotation to said turrets, said means comprising a gear crown on the turret and a gear wheel engaging said gear crown, substantially as described.

49. In a machine for cutting sheet-form material, the combination with the body of the machine, of a lower turret and an upper turret on a common axial line, cutting mechanism and sheet feeding mechanism supported by each of said turrets on the axial line of the turrets, and operator-controlled, power-actuated means for imparting rotation to said turrets, said means comprising friction gearing and also a gear crown on said turret and a gear wheel engaging said gear crown, substantially as described.

50. In a machine for cutting sheet-form material, the combination with the body of the machine, of a lower turret and an upper turret on a common axial line, cutting mechanism and sheet feeding mechanism supported by each of said turrets on the axial line of the turrets, operator-controlled, power-actuated means for imparting rotation to said turrets, and means for actuating the feed mechanism on the lower turret, substantially as described.

51. In a machine for cutting sheet-form material, the combination with the body of the machine, of a lower turret and an upper turret on a common axial line, cutting mechanism and sheet feeding mechanism supported by each of said turrets on the axial line of the turrets, operator-controlled, power-actuated means for imparting rotation to said turrets, means for actuating the cutting mechanism on the upper turret and actuating the feeding mechanism on the lower turret, substantially as described.

52. In a machine for cutting sheet-form material, the combination with the body of the machine, of a lower turret and an upper turret, cutting mechanism and sheet feeding mechanism supported on each of said turrets, a shaft in operative relation with one of said turrets for turning said turret, a friction wheel feathered for sliding on and rotating with said shaft, means to be actuated by the operator for sliding said wheel on said shaft, a friction disk, a drive shaft supporting said disk adjacent said friction wheel, means to be actuated by the operator for moving said disk toward and from said friction wheel, substantially as described.

53. In a machine for cutting sheet-form material, the combination with the body of the machine, of a lower turret and an upper turret, cutting mechanism and sheet feeding mechanism and a drum supported by each of said turrets, a pair of strap members having their ends extending partially around and attached to said drums, and guide members engaging said strap members between the ends of the latter and means for turning one of said turrets, substantially as described.

54. In a machine for cutting sheet-form material, the combination with the body of the machine, of a lower turret and an upper turret, cutting mechanism and sheet feeding mechanism and a drum supported by each of said turrets, a pair of strap members having their ends extending partially around and attached to said drums, and operator-controlled, power-actuated means for turning one of said turrets, substantially as described.

55. In a machine for cutting sheet-form material, the combination with the body of the machine, of a lower turret and an upper turret, cutting mechanism and sheet feeding mechanism and a drum supported by each of said turrets, a pair of strap members having their ends extending partially around and attached to said drums, the attachment of a portion of said ends being adjustable, guide members engaging said strap members between the ends of the latter, and means for turning one of said turrets, substantially as described.

56. In a machine for cutting sheet-form material, the combination with the body of the machine, of a lower turret and an upper turret, cutting mechanism and sheet feeding mechanism and a drum supported by each of said turrets, a pair of strap members having their ends extending partially around and attached to said drums, the attachment of a portion of said ends being adjustable, and operator-controlled, power-actuated means for turning one of said turrets, substantially as described.

57. In a machine for cutting sheet-form material, the combination with the body of the machine, of a lower turret and an upper turret, cutting mechanism and sheet feeding mechanism and a drum supported by each of said turrets, shiftable attaching members on one of said drums, and strap mechanism between said drums, substantially as described.

58. In a machine for cutting sheet-form material, the combination with the body of the machine, of a lower turret and an upper turret, cutting mechanism and sheet feeding mechanism and a drum supported by each of said turrets, and strap mechanism located on the front of the machine body and joined to said drums, and another strap mechanism located on the rear of the machine body and joined to said drums, substantially as described.

59. In a machine for cutting sheet-form material, the combination with the body of the machine, of a lower turret and an upper turret, cutting mechanism and sheet feeding mechanism and a drum supported by each of said turrets, a pair of guide rollers adjacent and opposite the lower drum, strap mechanism engaging said drums and said guide rollers and crossing each other between said guide rollers and the lower drum, substantially as described.

60. In a machine for cutting sheet-form material, the combination of a machine body having upper and lower bearings on a common upright axial line, a turret body in the upper bearing, a drum resting upon said upper bearing and secured to the upper end of the upper turret, a lower turret located in the lower bearing, a drum on said bearing, cutting mechanism and feeding mechanism supported by each of said turrets, and strap mechanism joining said drums, substantially as described.

61. In a machine for cutting sheet-form material, the combination of a machine body having upper and lower bearings on a common upright axial line, a turret body in the upper bearing, a drum resting upon said upper bearing and secured to the upper end of the upper turret, a lower turret located in the lower bearing and held against downward movement, a drum extending against the lower end of said bearing and secured to said turret, cutting mechanism and feeding mechanism supported by each of said turrets, and strap mechanism joining said drums, substantially as described.

62. In a machine for cutting sheet-form material, a pair of sheet feeding rollers located at opposite sides of the sheet plane, means yieldingly pressing one of said rollers toward the other, and power-actuated, operator-controlled means for forcibly moving said roller away from the other roller, substantially as described.

63. In a machine for cutting sheet-form material, a lower turret and an upper turret, a pair of sheet feeding rollers standing in opposition to each other at opposite sides of the sheet plane and one being supported by one of said turrets and the other being supported by the other of said turrets, yielding means pressing one of said rollers toward the other, and operator-controlled power-actuated means for forcibly moving said yielding roller away from the other roller, substantially as described.

64. In a machine for cutting sheet-form material, a lower turret and an upper turret, cutting means on the lower turret, a reciprocatory cutter on the axial line of the upper turret, a pair of sheet feeding rollers standing in opposition to each other at opposite sides of the sheet plane and one being supported by one of said turrets and the other being supported by the other of said turrets, yielding means pressing one of said rollers toward the other, and operator-controlled, power-actuated means for forcibly moving said yielding roller away from the other roller, substantially as described.

65. In a machine for cutting sheet-form material, a lower turret and an upper turret, a pair of sheet feeding rollers standing in opposition to each other at opposite sides of the sheet plane and one being supported by one of said turrets and the other being supported by the other of said turrets, yielding means pressing one of said rollers toward the other, and operator-controlled, power-actuated means, comprising friction gearing, for forcibly moving said yielding roller away from the other roller, substantially as described.

66. In a machine for cutting sheet-form material, a lower turret and an upper turret, a pair of sheet feeding rollers standing in opposition to each other at opposite sides of the sheet plane and one being supported by one of said turrets and the other being supported by the other of said turrets, yielding means pressing one of said rollers toward the other, operator-controlled, power-actuated means for forcibly moving said yielding roller away from the other roller, and means for rotating the lower sheet feeding roller, substantially as described.

67. In a machine for cutting sheet-form material, a pair of sheet feeding rollers located at opposite sides of the sheet plane, an upright, slidable stem supporting the upper of said rollers, means normally yieldingly pressing said stem toward the other of said rollers, and power-actuated, operator-controlled means for forcibly raising said stem, substantially as described.

68. In a machine for cutting sheet-form material, a lower turret and an upper turret, a pair of sheet feeding rollers standing in opposition to each other at opposite sides of the sheet plane and one being supported by the lower of said turrets, an upright stem slidably supported in the other of said turrets and supporting the other of said rollers, means yieldingly pressing said stem toward the opposite roller, and operator-controlled, power-actuated means for forcibly moving said stem away from the opposite roller, substantially as described.

69. In a machine for cutting sheet-form material, a lower turret and an upper turret, a pair of sheet feeding rollers standing in opposition to each other at opposite sides of the sheet plane and one being supported by the lower of said turrets, an upright stem slidably supported in the other of said turrets and supporting the other of said rollers, means yieldingly pressing said stem toward the opposite roller, and operator-controlled, power-actuated means comprising a cam located on the adjacent turret for forcibly moving said stem away from the opposite roller, substantially as described.

70. In a machine for cutting sheet-form material, a lower turret and an upper turret, a pair of sheet feeding rollers standing in opposition to each other at opposite sides of the sheet plane and one being supported by the lower of said turrets, an upright stem slidably supported in the other of said turrets and supporting the other of said rollers, means yieldingly pressing said stem toward the opposite roller, and operator-controlled, power-actuated means comprising a reversible cam located on the adjacent turret for forcibly moving said stem away from the opposite roller, substantially as described.

71. In a machine for cutting sheet-form material, a lower turret and an upper turret, a pair of sheet feeding rollers standing in opposition to each other at opposite sides of the sheet plane and one being supported by the lower of said turrets, an upright stem slidably supported in the other of said turrets and supporting the other of said rollers, means yieldingly pressing said stem toward the opposite roller, and operator-controlled, power-actuated means comprising a cam and friction gearing located on the adjacent turret for forcibly moving said stem away from the opposite roller, substantially as described.

In testimony whereof I have signed my name this 19th day of November, in the year one thousand nine hundred and eighteen.

CHARLES BAXTER GRAY.